US012577345B2

(12) United States Patent
Mitchell et al.

(10) Patent No.: US 12,577,345 B2
(45) Date of Patent: Mar. 17, 2026

(54) RADIATION BLOCKERS FOR CONTACT LENSES

(71) Applicant: CooperVision International Limited, Fareham (GB)

(72) Inventors: William Mitchell, Chandler's Ford (GB); Ian Gibson, Southampton (GB); Robert Andrew Broad, Hampshire (GB); David Morsley, Hampshire (GB); Katarzyna Piskorczyk, Southampton (GB); Laura Simpson, Southampton (GB)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 0 days.

(21) Appl. No.: 18/868,795

(22) PCT Filed: May 14, 2024

(86) PCT No.: PCT/GB2024/051247

§ 371 (c)(1),
(2) Date: Nov. 25, 2024

(87) PCT Pub. No.: WO2024/236287

PCT Pub. Date: Nov. 21, 2024

(65) Prior Publication Data

US 2025/0109234 A1 Apr. 3, 2025

(30) Foreign Application Priority Data

May 15, 2023 (GB) .................................... 2307235
Jun. 30, 2023 (GB) .................................... 2310006
Oct. 4, 2023 (EP) .................................... 23201595

(51) Int. Cl.
*C08F 290/06* (2006.01)
*G02B 1/04* (2006.01)

(52) U.S. Cl.
CPC .......... *C08F 290/068* (2013.01); *G02B 1/043* (2013.01)

(58) Field of Classification Search
None
See application file for complete search history.

(56) References Cited

U.S. PATENT DOCUMENTS 4,997,897 A 3/1991 Melpolder
5,470,932 A 11/1995 Jinkerson
5,944,853 A 8/1999 Molock et al.
7,216,975 B2 5/2007 Hong
7,750,079 B2 * 7/2010 Almond ................ C08F 226/10 522/182
2005/0243272 A1 11/2005 Mainster et al.
2007/0291223 A1 * 12/2007 Chen ...................... G02B 1/043 351/159.02
2007/0296914 A1 12/2007 Hong et al.
2008/0048350 A1 2/2008 Chen et al.
2009/0234089 A1 9/2009 Ueyama et al.
2016/0357031 A1 12/2016 Holland et al.
2018/0354214 A1 12/2018 Wu et al.
2018/0355112 A1 12/2018 Zhang et al.
2018/0356562 A1 12/2018 Wu et al.
2019/0225726 A1 7/2019 DeSousa et al.
2019/0300654 A1 10/2019 Wu et al.
2020/0095187 A1 3/2020 Arnold et al.
2021/0181379 A1 6/2021 Zheng et al.
2021/0214321 A1 7/2021 Chen et al.
2021/0371731 A1 12/2021 Jing et al.
2022/0075210 A1 * 3/2022 Broad .................... G02C 7/108

FOREIGN PATENT DOCUMENTS

EP 3634733 B1 7/2021
JP 2022190923 A 12/2022
WO 9409042 A1 4/1994
WO 2008048880 A2 4/2008
WO 2019166971 A1 9/2019

OTHER PUBLICATIONS

International Search Report and Written Opinion issued in corresponding International Patent Application No. PCT/GB2024/051247 dated Sep. 18, 2024 (14 pages).
PCT Demand filed Oct. 21, 2024 in corresponding International Patent Application No. PCT/GB2024/051247 (14 pages).
International Preliminary Report on Patentability issued in corresponding International Patent Application No. PCT/GB2024/051247 dated Nov. 6, 2024 (15 pages).
Combined Search and Examination Report issued in corresponding United Kingdom Patent Application No. GB2307235.8 dated Sep. 8, 2023 (7 pages).
Extended European Search Report issued in corresponding European Patent Application No. 23201595.8 dated Mar. 19, 2024 (8 pages).
Office Action issued in corresponding Japanese Patent Application 2024-573803 issued Jun. 12, 2025 (11 pages).
Office Action issued in corresponding Chinese Patent Application 202480003419.4 issued Jul. 5, 2025 (18 pages).

* cited by examiner

*Primary Examiner* — Tae H Yoon
(74) *Attorney, Agent, or Firm* — Kilyk & Bowersox, P.L.L.C.

(57) ABSTRACT

A hydrogel contact lens formulation for forming the polymeric body of a hydrogel contact lens comprising: a first high energy visible light (HEVL) absorber comprising a benzotriazole moiety and a second different high energy visible light (HEVL) absorber comprising a benzotriazole moiety, and a hydrogel contact lens obtained from the polymerisation of the formulation.

29 Claims, 2 Drawing Sheets

RADIATION BLOCKERS FOR CONTACT LENSES

This application is a National Stage Application of PCT/GB2024/051247, filed May 14, 2024, which claims priority to United Kingdom Patent Application No. 2307235.8, filed May 15, 2023, and to United Kingdom Patent Application No. 2310006.8, filed Jun. 30, 2023, and to European Patent Application No. 23201595.8, filed Oct. 4, 2023.

The present invention relates to combinations of radiation blockers for use in contact lenses and contact lenses comprising said combinations of radiation blockers. In particular, this invention relates to combinations of radiation blockers that have been found to impart advantageous properties to hydrogel contact lenses including advantageous light transmission characteristics.

BACKGROUND

The eye is at potential risk to damage when exposed to light in the ultraviolet (UV), visible and infrared (IR) bands of the electromagnetic spectrum. UV light has the highest energy and greatest potential to cause damage followed by the violet-blue component of the visible spectrum, i.e. high energy visible light (HEVL) at wavelengths of from 380 to 455 nm.

Compounds that absorb light at wavelengths that are harmful to the human eye, have previously been included in contact lenses formulations. Many UV absorbing agents are known as ingredients for polymeric materials used to make ophthalmic lenses, including contact lenses. UV absorbing agents are typically compounds that include a chromophore that absorbs light in the UV spectrum, i.e. wavelengths in the range of 100-380 nm. Benzotriazole, benzophenone and triazine-containing compounds are known to absorb UV light and such compounds may be added to contact lens materials to provide protection from UV radiation. In addition to blocking UV light, some ophthalmic lenses also block blue light. Yellow dyes, including polymerizable yellow dyes, have been added to contact lenses to absorb harmful blue light radiation as described, for example, in U.S. Pat. No. 5,470,932. These lenses block both UV and HEVL by using two chromophores: a UV absorber and a yellow dye. Many yellow dyes absorb blue light over a wide wavelength range and reduce the transmission of blue light across the 380 to 500 nm range.

If a sharper cut-off of the transmission spectrum in the high energy blue-violet region is desired, a selective blue light blocker can be used as described in US 2005/0243272 and WO 2008/048880. Such blue light blockers selectively filter wavelengths in the range of 380-455 nm, often with little or no absorption of wavelengths above 450 nm. Benzotriazole blue light blockers have been developed that selectively absorb light with wavelengths in the range of 380-455 nm. However, it has been found that known benzotriazole blue light blockers may need to be included in large quantities in order to substantially reduce the level of transmission of light in the of 380-455 nm range and/or may result in undesirable yellowing of the resulting contact lens. Including large quantities of benzotriazole blue light blockers in contact lens formulations, such as amounts of 2% or more by weight of the entire lens composition can negatively affect the properties of the contact lens material and/or hinder the processing of a contact lens formulation. For example, including high levels of radiation absorbing compounds in a hydrogel contact lens formulation can reduce the wettability of the resulting hydrogel contact lens, result in higher incidence of lens defects and/or hinder the de-lensing of the hydrogel lens body from a mould after casting. Including blue light blockers in lens formulations, especially at high quantities, can also lead to a yellow colouration being imparted to the lens. Imparting a yellow colouration to contact lenses gives the wearer's eye and undesirable yellow hue that is less acceptable to consumers than lenses that leave the natural colouration of the eye unchanged.

US 2021/0181379 describes lens formulations that include a benzotriazole UV absorbing agent, such as Norbloc, together with a benzotriazole HEVL absorbing agent to reduce transmittance of both UV and violet light through a contact lens.

It is also known to include tinting agents in contact lenses to alter the colour of contact lenses for aesthetic purposes or to enable the lenses to be more visible when in solution. While tinting agents can be used to counteract the yellowing effect of blue light blockers, there is a need for a radiation absorber package for use in formulating hydrogel contact lenses, especially silicone hydrogel contact lenses, that when included in lens formulations in low amounts, such as 3% by weight or less, can substantially reduce the amount of transmission of harmful wavelengths of light. Ideally, hydrogel contact lenses produced using such formulations will also be non-yellowing.

SUMMARY OF THE INVENTION

In a first aspect the present invention provides a radiation absorber package for use in formulating hydrogel contact lenses comprising a first high energy, short wavelength visible light absorber comprising a benzotriazole moiety and a second different high energy, short wavelength visible light absorber comprising a benzotriazole moiety. The radiation absorber package of the first aspect of the invention optionally further comprises a polymerizable UV absorbing agent comprising a benzophenone moiety.

In a second aspect, the invention provides a hydrogel contact lens formulation, especially a silicone hydrogel contact lens formulation, comprising the radiation absorber package of the first aspect of the invention. The hydrogel contact lens formulation is a polymerizable formulation for forming the body of a hydrogel contact lens. Thus, the hydrogel contact lens formulation of the second aspect of the invention comprises a first high energy, short wavelength visible light absorber comprising a benzotriazole moiety and a second different high energy, short wavelength visible light absorber comprising a benzotriazole moiety. The hydrogel contact lens formulation of the second aspect of the invention optionally further comprises a polymerizable UV absorbing agent comprising a benzophenone moiety. In addition to radiation absorbing compounds, the hydrogel contact lens formulations of the second aspect of the invention typically contain polymerizable monomers, oligomers and/or pre-polymers, one or more crosslinkers and one or more polymerization initiators.

In a third aspect, the invention provides a hydrogel contact lens, especially a silicone hydrogel contact lens formed from the polymerisation of the formulation of the second aspect of the invention. Thus the polymeric lens material of the hydrogel contact lens of the third aspect of the invention comprises a first high energy, short wavelength visible light absorbing unit comprising a benzotriazole moiety and a second different high energy, short wavelength visible light absorbing unit comprising a benzotriazole moiety. The polymeric lens material of the hydrogel contact lens of the third aspect of the invention optionally further comprises a UV light absorbing unit comprising a benzophenone moiety.

In a fourth aspect, the invention provides a method of manufacturing a hydrogel contact lens, especially a silicone hydrogel contact lens, comprising the step of polymerising a formulation of the second aspect of the invention to form a polymeric contact lens body. Thus, the method of manufacturing a hydrogel contact lens of the fourth aspect of the invention comprises the step of polymerising a formulation comprising a first high energy, short wavelength visible light absorber comprising a benzotriazole moiety and a second different high energy, short wavelength visible light absorber comprising a benzotriazole moiety to form a polymeric contact lens body. The formulation polymerised in the method of the fourth aspect of the invention optionally further comprises a polymerizable UV absorbing agent comprising a benzophenone moiety.

It has been found that by including a combination of two different benzotriazole HEVL absorbers in a contact lens formulation each with different absorption properties, it is possible to obtain a contact lens with improved properties to that which can be produced using a single type of benzotriazole HEVL light absorber. In particular, a contact lens produced from the formulations containing a combination of two different benzotriazole HEVL absorbers has been found to provide a desirable reduction in the levels of light in the 380-455 nm range transmitted by the contact lens when lower overall amounts of benzotriazole high energy, short wavelength visible light absorbers are included in the formulation. In addition, a contact lens produced from the formulations of the invention containing a combination of two different benzotriazole high energy, short wavelength visible light absorbers has been found to provide a desirable reduction in the levels of light in the 380-455 nm range transmitted by the contact lens without substantial yellowing of the contact lens body. In particular, the formulations of the invention have been found to provide hydrogel contact lenses that block at least 40%, especially at least 50% of blue light in the 380-455 nm range without excess yellowing or requiring large quantities of blue light blocker. Advantageously, the highest wavelength at which a 0.003 wt % solution in ethyl acetate (≥99.8%, HPLC grade) of the second HEVL absorber has an absorbance of 0.1 is at least 10 nm below the highest wavelength at which a 0.003 wt % solution in ethyl acetate of the first HEVL absorber has an absorbance of 0.1, wherein the absorbance of the solutions is measured in a 10 mm path length quartz cell using a Perkin Elmer Lambda 365 spectrometer.

DETAILED DESCRIPTION

Figure 1:
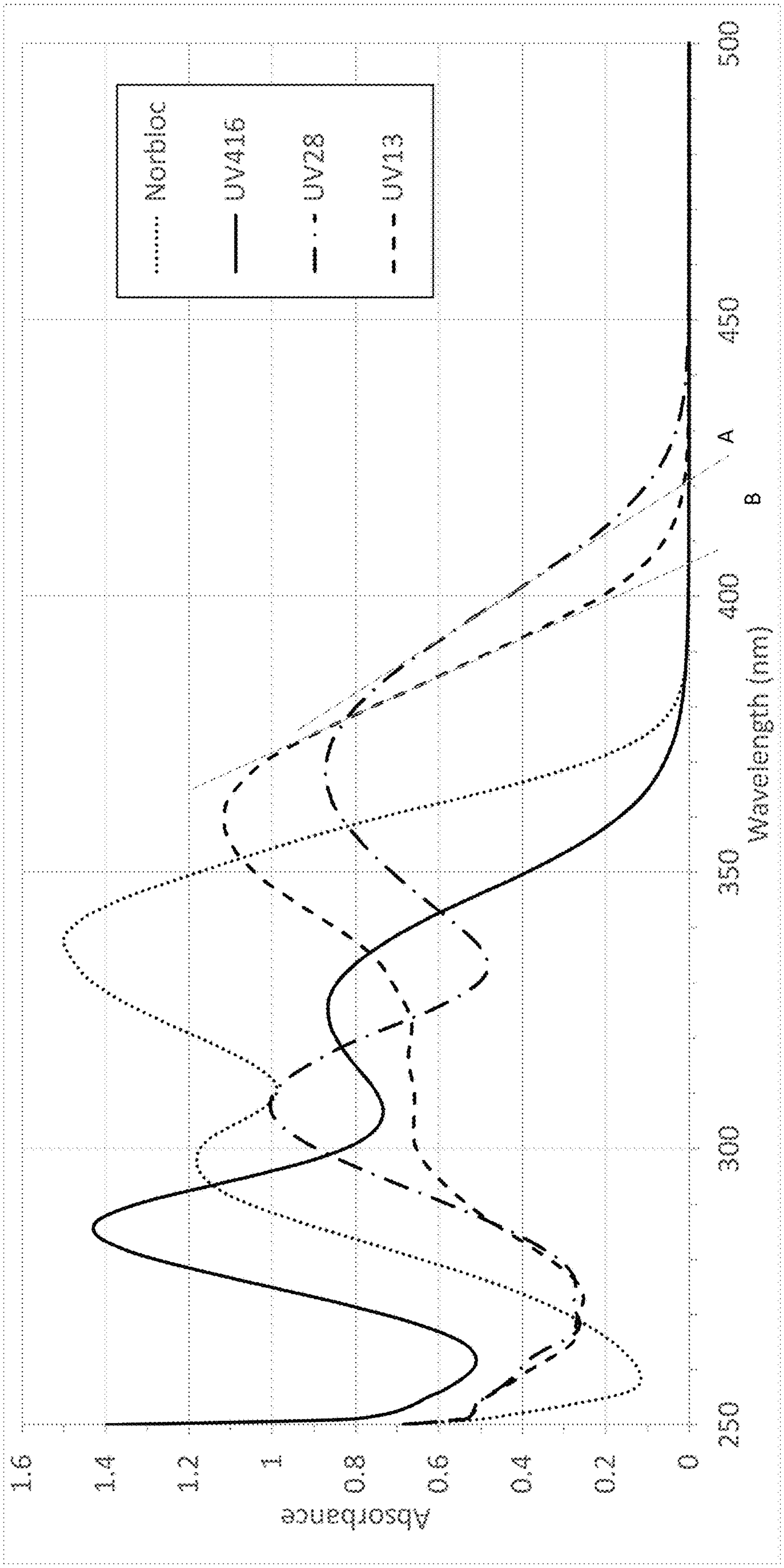
FIG. 1 shows light absorbance spectra for 0.003 wt % solutions of Norbloc, UV416, UV13 and UV28 in ethyl acetate, with absorbance on the y-axis and the wavelength in nm on the x-axis.

The present disclosure will be more fully understood and further advantages will become apparent when reference is made to the following detailed description of embodiments of the present disclosure. The invention will be described in further detail with particular reference to the formulations of the second aspect of the invention, i.e. formulations used in the method of the fourth aspect of the invention, hereinafter referred to as "formulations of the invention". However, it is to be understood that as the contact lenses of the third aspect of the invention are obtainable from polymerising the formulations of the second aspect of the invention, e.g. in accordance with the methods of the fourth aspect of the invention, constituents of the formulations of the second aspect of the invention will be present in polymerised form in the polymeric lens material of the contact lenses of the third aspect of the invention. Likewise, it is to be understood that the radiation absorber package of the first aspect of the invention are the constituents of the formulation of the second aspect of the invention that include chromophores which absorb light across the UV and visible spectra. Features of the radiation absorber packages, formulations or lenses, or components thereof, or methods of manufacturing lenses (depending on context) that are referred to herein can be combined with any combination of previously-described or subsequently-described features, unless a particular combination of features is mutually exclusive, or if context indicates otherwise. Further, as used in this specification, the singular forms "a," "an," and "the" include plural referents (e.g. at least one or more) unless the context clearly dictates otherwise. Thus, for example, reference to "a contact lens" includes a single lens as well as two or more of the same or different lenses.

The present disclosure is based on the discovery that it is possible to more effectively provide contact lenses with blue-light blocking characteristics that prevent the transmission of significant amounts of HEVL by including a combination of at least two different benzotriazole HEVL absorbers in the polymerizable formulation from which the contact lens is produced. Such a combination balances the undesirable yellow colouration of a lens having blue-blocking properties by including a second HEVL absorber which absorbs at a shorter wavelength than the first HEVL absorber. Such a combination also absorbed a greater proportion of light across the 380-455 nm wavelength than may be obtained using a single benzotriazole HEVL absorber. Optionally, a third radiation absorbing compound which is a benzophenone UV absorber is included to enhance absorbance of UV light below 380 nm. Benzophenone UV absorbers have found to be particularly suited to inclusion in combination with benzotriazole HEVL absorber due to their having a significantly different absorption profile.

The "polymeric contact lens material" of the contact lens of the third aspect of the invention refers to the material that is bound into the contact lens body, whether by covalent bonds, physical entanglement or otherwise. Material that can be removed from the lens body with extraction with water, ethanol, isopropanol or mixtures thereof does not constitute part of the polymeric contact lens material, nor do solvents such as water that can be removed from the contact lens body by drying. The polymerizable constituents of the formulations of the second aspect of the invention are typically incorporated into the polymeric contact lens material of the third aspect of the invention.

The term "radiation absorber package" refers collectively to UV blockers, high energy, short wavelength visible light absorbers and coloured tints that absorb light in wavelengths from 100 to 700 nm range.

High energy visible light (HEVL) absorbers are compounds that includes a chromophore that absorbs visible light in the violet-blue range of 350-455 nm. Typically, a HEVL absorber has an absorption maximum (λmax) in the range of 350-455 nm, especially in the range of 350-400 nm. The term "high energy visible light (HEVL) absorber" as used herein may be defined as a compound which, as a 0.003 wt % solution in ethyl acetate (≥99.8%, HPLC grade), has an absorbance of at least 0.5 within the range of 375 nm to 450 nm (solutions are measured in a 10 mm path length quartz cell and the absorbance of the solution from 250-800 mm measured using a Perkin Elmer Lambda 365). A HEVL absorber may additionally absorb light of shorter wavelengths, for example in the 250 to 350 nm range, and thus function both as a HEVL absorber and as a UV absorbing agent as discussed below. Unless otherwise stated, all absorbance spectra referred to herein are measured as 0.003 wt % solutions in ≥99.8%, HPLC grade, ethyl acetate in a 10 mm path length quartz cell using a Perkin Elmer Lambda 365 spectrometer.

Advantageously, HEVL absorbers used in contact lens formulations, including the contact lens formulations of the present invention, possess a polymerizable moiety, such as vinyl, acrylate or methacrylate functionality in their chemical structure, for covalent incorporation into the contact lens material during polymerization. Once incorporated into a polymeric contact lens material, the HEVL absorbers impart HEVL absorption properties to the polymeric contact lens material. The HEVL absorbers used in the present invention are typically soluble in the contact lens formulation and are polymerizable so that they form part of the polymeric matrix of the lens and are retained in the lens during autoclave and storage.

References herein to an amount of an ingredient or component present in a formulation expressed in terms of weight percent (i.e. % (wt/wt)) are based on the amount of all formulation ingredients excluding diluents and/or solvents that are not incorporated into the final polymeric contact lens material. Thus, for example, the amount of a radiation absorber package in a formulation made by mixing together 1.5 parts radiation absorber package, 65 parts monomer(s), 3.5 parts other active ingredients (e.g. polymerization initiator, tinting agent, oxygen scavenger, etc.) and 30 parts organic solvent and/or water (for a total of 100 parts) is 2.1% (wt/wt). As used herein a "component" of a formulation refers collectively to all ingredients of a particular type. For example, if a formulation comprises 20% (wt/wt) of a first siloxane monomer and 15% of a second siloxane monomer and no other siloxanes, the formulation can be described as comprising 35% (wt/wt) of a siloxane component.

Advantageously, the benzotriazole HEVL absorber component of the formulation of the second aspect of the invention or used in the method of the fourth aspect of the invention does not exceed 2.7% (wt/wt), and preferably does not exceed 2.0% (wt/wt). Advantageously, the total amount of all HEVL absorbers present in the formulation of the second or fourth aspects of the invention does not exceed 2.7% (wt/wt), and preferably does not exceed 2.0% (wt/wt). Alternatively or additionally, the total amount of benzotriazole compounds present in the formulation of the second or fourth aspects of the invention optionally does not exceed 2.7% (wt/wt), and preferably does not exceed 2.0% (wt/wt). Advantageously, the total amount of benzotriazole HEVL absorbers incorporated into the polymeric lens material of the third aspect of the invention does not exceed 2.7% (wt/wt), and preferably does not exceed 2.0% (wt/wt), of the total polymeric lens material. Advantageously, the total amount of all HEVL absorbers incorporated into the polymeric lens material of the third aspect of the invention does not exceed 2.7% (wt/wt), and preferably does not exceed 2.0% (wt/wt), of the total polymeric lens material. Alternatively or additionally, the total amount of benzotriazole compounds present in the polymeric lens material of the third aspect of the invention optionally does not exceed 2.7% (wt/wt), and preferably does not exceed 2.0% (wt/wt), of the total polymeric lens material.

The first HEVL absorber may be present in the formulation in an amount of from 0.3% to 0.9% (wt/wt), preferably from 0.4% to 0.7% (wt/wt). The second HEVL absorber may be present in the formulation in an amount of from 0.5% to 2.2% (wt/wt), preferably from 0.7% to 1.6% (wt/wt). Optionally, the first HEVL absorber may be present in the formulation in an amount of from 0.3% to 0.9% (wt/wt), preferably from 0.4% to 0.7% (wt/wt) and the second HEVEL absorber may be present in an amount of from 0.5% to 2.2% (wt/wt), preferably from 0.7% to 1.6% (wt/wt).

The first and second HEVL absorbers in the formulations of the second aspect of the invention or used in the method of the fourth aspect of the invention are each optionally of formula (1):

(1)

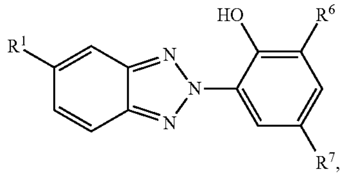

wherein:

$R^1$ is a halogen, OH, $C_{1-12}$ alkyloxy, -A-$R^9$—Y, optionally substituted $C_{1-12}$ alkyl, optionally substituted phenoxy, or optionally substituted napthyloxy, where the optional substituents are halogen, $C_{1-6}$ alkyl, $C_{1-6}$ alkoxy, OH, $—(CH_2CH_2O)_nH$, $—(CH_2CH_2O)_nCH_2CH_3$, $—(CH_2CH(CH_3)O)_nH$ or $—(CH_2CH(CH_3)O)_nCH_2CH_2(CH_3)$;

one of $R^6$ and $R^7$ is H or $C_{1-12}$ alkyl optionally substituted with halogen; and the other of $R^6$ and $R^7$ is:

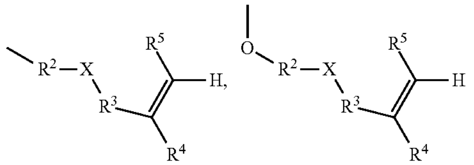

or $—OR^8$;

in which:

$R^2$ is a bond, $C_{1-12}$ alkylene optionally substituted with —OH and/or optionally interrupted by an ester group, $(CH_2CH_2O)_n$ or $(CH_2CH(CH_3)O)_n$;

X is a bond, O, $NR^4$, S or $(Si(CH_3)_2O)_mSi(CH_3)_2$;

$R^3$ is a bond, C(O), $C(O)C_jH_{2j}$, $C_{1-6}$ alkylene, phenyl, or $C_{1-6}$ alkylphenyl;

each $R^4$ is independently H or methyl;

$R^5$ is H, $C_1$-6 alkyl, or phenyl;

m is 0-9;

n is 2-10;

j is 1-6;

A is —S— or $—SO_2—$;

$R^8$ is H, $C_{1-12}$ alkyl, $C_{6-15}$ arylalkyl or $—R^9—Z$;

each $R^9$ is independently $C_{1-12}$ alkylene optionally substituted with —OH and/or interrupted by an ester group;

each of Y and Z respectively is —OH, —OC(O)$R^{10}$, —$NH_2$, —NC(O) $R^{10}$, —NCO, —$CO_2H$, —$CO_2R^{10}$,

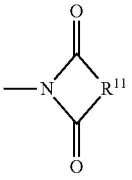
or
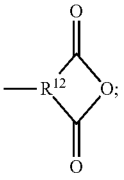
;

each $R^{10}$ is independently $C_{1-10}$ alkyl or $C_{3-10}$ alkenyl;

$R^{11}$ is $C_{3-10}$ cycloalkenylene; and $R^{12}$ is $C_{1-10}$ alkylene or 1,2-phenylene.

In some aspects of the invention, the first and second HEVL absorbers are each optionally of formula (1) above wherein:

$R^1$ is a halogen, OH, $C_{1-12}$ alkyloxy, optionally substituted $C_{1-12}$ alkyl, optionally substituted phenoxy, or optionally substituted napthyloxy, where the optional substituents are halogen, $C_{1-6}$ alkyl, $C_{1-6}$ alkoxy, OH, —$(CH_2CH_2O)_nH$, —$(CH_2CH_2O)_nCH_2CH_3$, —$(CH_2CH(CH_3)O)_nH$ or —$(CH_2CH(CH_3)O)_n$ $CH_2CH_2$ $(CH_3)$;

one of $R^6$ and $R^7$ is H or $C_{1-12}$ alkyl optionally substituted with halogen; and the other of $R^6$ and $R^7$ is:

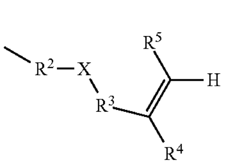
or
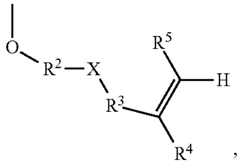
, in which:

$R^2$ is a bond, $C_{1-12}$ alkylene optionally substituted with —OH and/or interrupted by an ester group, $(CH_2CH_2O)$ n or $(CH_2CH(CH_3)O)_n$;

$R^3$ is a bond, C(O), C(O)$C_jH_{2j}$, $C_{1-6}$ alkylene, phenyl or $C_{1-6}$ alkylphenyl;

X is a bond, O, $NR^4$, S or $(Si(CH_3)_2O)_mSi(CH_3)_2$;

each $R^4$ is independently H or methyl;

$R^5$ is H, $C_{1-6}$ alkyl, or phenyl;

m is 0-9;

n is 2-10; and j is 1-6.

In some further aspects of the invention, the first and second HEVL absorbers are each optionally of formula (1) above wherein:

$R^1$ is H, Cl, Br, OH, $C_{1-4}$ alkoxy, $C_{1-4}$ alkyl optionally substituted with halogen, or phenoxy;

one of $R^6$ and $R^7$ is H or $C_{1-4}$ alkyl optionally substituted with halogen; and the other of $R^6$ and $R^7$ is:

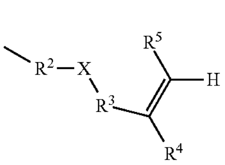
or
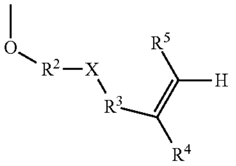

in which:

$R^2$ is a bond or $C_{1-6}$ alkyl;

X is a bond, O, $Si(CH_3)_2$ or $NR^4$;

$R^3$ is a bond, C(O) or $C_{1-6}$ alkylphenyl;

each $R^4$ is independently H or methyl; and $R^5$ is H.

In yet further aspects of the invention, the first and second HEVL absorbers are each optionally of formula (1) above wherein:

$R^1$ is H, Cl, methoxy, $C_{1-4}$ alkyl or trifluoromethyl;

one of $R^6$ and $R^7$ is H, $C_{1-4}$ alkyl or trifluoromethyl; and the other of $R^6$ and $R^7$ is:

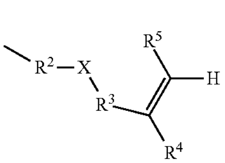
or
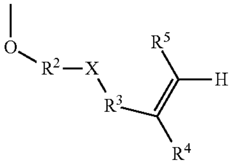

in which:

$R^2$ is $C_{1-6}$ alkyl;

X is a bond, O, $Si(CH_3)_2$ or $NR^4$;

$R^3$ is a bond, C(O) or $C_{1-6}$ alkylphenyl;

each $R^4$ is independently H or methyl; and $R^5$ is H.

The first and second HEVL absorbers in the formulations of the second aspect of the invention or used in the method of the fourth aspect of the invention are each optionally of formula (1a):

(1a)

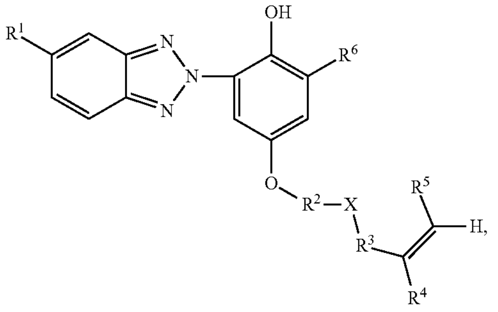

wherein:

$R^1$ is a halogen, OH, $C_{1-12}$ alkyloxy, optionally substituted $C_{1-12}$ alkyl, optionally substituted phenoxy, or optionally substituted napthyloxy, where the optional substituents are halogen, $C_{1-6}$ alkyl, $C_{1-6}$ alkoxy, OH, —$(CH_2CH_2O)_nH$, —$(CH_2CH_2O)_nCH_2CH_3$, —$(CH_2CH(CH_3)O)_nH$ or —$(CH_2CH(CH_3)O)_n$ $CH_2CH_2$ $(CH_3)$;

$R^2$ is a $C_{1-12}$ alkylene optionally substituted by OH and/or interrupted by an ester group, $(CH_2CH_2O)$ n or $(CH_2CH(CH_3)O)_n$;

X is a bond if $R^2$ is $(CH_2CH_2O)$, or $(CH_2CH(CH_3)O)$ n, otherwise X is O, $NR^4$, S or $(Si(CH_3)_2O)_mSi(CH_3)_2$;

$R^3$ is a bond, C(O), $C(O)C_jH_{2j}$, $C_{1-6}$ alkylene, phenyl, or $C_{1-6}$ alkylphenyl;

each $R^4$ is independently H or methyl;

$R^5$ is H, $C_{1-6}$ alkyl, or phenyl;

$R^6$ is H or $C_{1-12}$ alkyl optionally substituted with halogen;

m is 0-9;

n is 2-10; and j is 1-6.

When $R^2$ is $(CH_2CH_2O)_n$ or $(CH_2CH(CH_3)O)$, in compounds of formula (1) and (1a) above, X is typically other than O, for example X may be a bond when $R^2$ is $(CH_2CH_2O)_n$ or $(CH_2CH(CH_3)O)_n$.

For the avoidance of doubt, when two or more of $R^2$, X and $R^3$ which are adjacent are each a bond in compounds of formula (1) and (1a) above, then the two or more adjacent groups together form a single bond.

The term "alkyl" as used herein refers to both straight chain and branched alkyl groups unless stated otherwise. Thus, for example, references to a C4 alkyl group, refer to any or all of n-butyl, isobutyl, s-butyl and t-butyl groups. The term "alkylene" as used herein refers to both straight chain and branched divalent saturated alkanediyl radicals unless stated otherwise. Thus, for example, references to a C3 alkylene, refer to any or all-$CH_2$—$CH_2$—$CH_2$—, —CH $(CH_3)$—$CH_2$—, —$CH_2$—$CH(CH_3)$—, —$C(CH_3)$ 2-and-$CH(CH_2CH_3)$— groups.

Optionally, the polymeric contact lens materials of the contact lenses of the third aspect of the invention comprise two different units derived from the polymerisation of compounds of formula (1) above.

The first and second HEVL absorbers in the formulations of the second aspect of the invention or used in the method of the fourth aspect of the invention are each optionally of formula (2):

(2)

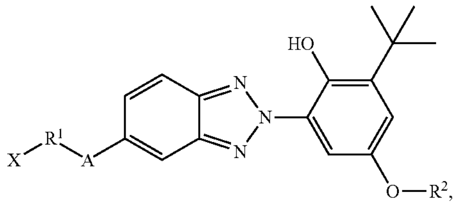

wherein:

A is —S or —$SO_2$—

$R^1$ is $C_{1-12}$ alkylene optionally substituted with —OH and/or interrupted by an ester group;

$R^2$ is H, $C_{1-12}$ alkyl, or $C_{6-15}$ arylalkyl or —$R^3Y$;

$R^3$ is $C_{1-12}$ alkylene optionally substituted with —OH and/or interrupted by an ester group;

each of X and Y respectively is —OH, —OC(O) $R^4$, —$NH_2$, —$NC(O)R^4$, —NCO, —$CO_2H$, —$CO_2R^4$,

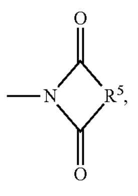 or 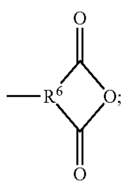

each of $R^4$ is independently $C_{1-12}$ alkyl or $C_{3-10}$ alkenyl;

$R^5$ is $C_{3-10}$ cycloalkenylene; and $R^6$ is $C_{1-10}$ alkylene or 1,2-phenylene.

Examples of HEVL absorbers of formula (2) can be found in US 2021/0214321 A1, the content of which is incorporated herein by reference. Particular examples of HEVL absorbers of formula (2) that may be included in the formulations of the present invention are those of formulas (I-1) to (I-13) of US 2021/0214321 A1.

The presence of a sulphur-containing group at the 5-position of the benzotriazole ring in the HEVL absorbers of formula (2) has been found to provide a red-shift to the principal absorption peaks of the benzotriazole compounds compared to those lacking the sulphur-containing group, e.g. in compounds of formula (1) or (1a) above. Thus, compounds of formula (2) may be particularly useful as the second HEVL absorber in the formulations of the present invention. The formulations of the present invention may, for example, include UV28 as a first HEVL absorber and a compound of formula (2) as a second HEVL absorber. The presence of a sulphur-containing group at the 5-position of the benzotriazole ring in the HEVL absorbers of formula (2) has also been found to extend upwards the absorption range of a benzotriazole compounds compared to those lacking the sulphur-containing group, e.g. in compounds of formula (1) or (1a) above, and provide greater levels of absorbance in the range of 400 to 450 nm. Thus, some compounds of formula (2) may be also useful as the first HEVL absorber in the formulations of the present invention.

Examples of benzotriazole HEVL absorbers include:

2-(1,1-dimethylethyl)-4-[3-[(4-ethenyl phenyl) methoxy] propoxy]-6-(5-methoxy-2H-benzotriazol-2-yl)-phenol (UV1, CAS #159732-06-6):

UV1

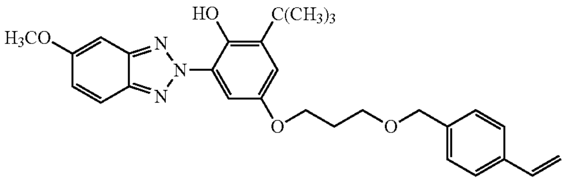

, 2-(5-chloro-2H-benzotriazol-2-yl)-6-(1,1-dimethylethyl)-4-ethenyl-phenol (UV5/UVAM, CAS #124883-10-9):

UV5

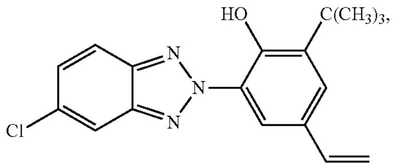

2-(2-hydroxy-5-methacrylamidophenyl)-5-methoxy-2H-benzotriazole (UV6, CAS #110927-08-7):

UV6

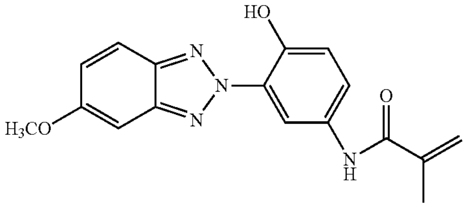

, 2-(3-allyl-2-hydroxy-5-methylphenyl)-2H-benzotriazole (UV9, CAS #2170-39-0):

UV9

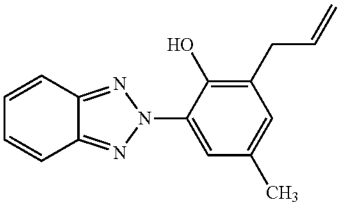

, 1-methallyl-2-(2-hydroxy-5-methyl phenyl)benzotriazole (UV12, CAS #98809-58-6):

UV12

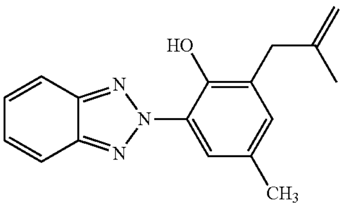

,

2-[2'-hydroxy-3'-tert-butyl-5'-(3"-methacryloyloxy-propoxy)phenyl]-5-methoxy-2H-benzotriazole (UV13, CAS #114166-71-1):

UV13

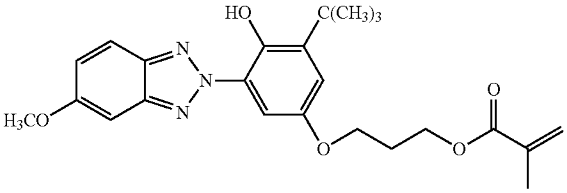

, 2-3'-t-butyl-2'-hydroxy-5'-(3"-dimethylvinylsilyl-propoxy)-2'-hydroxy-phenyl)-5-methoxybenzotriazole (UV15, CAS #122430-79-9):

UV15

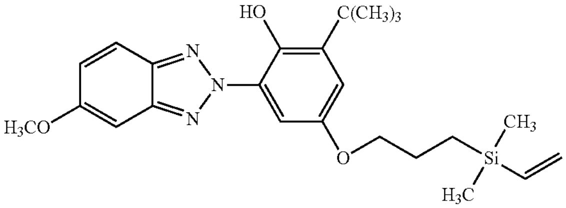

, 2-(2'-hydroxy-5'-methacryloylpropyl-3'-tert-butyl-phenyl)-5-methoxy-2H-benzotriazole (UV16, CAS #1245624-41-2):

UV16

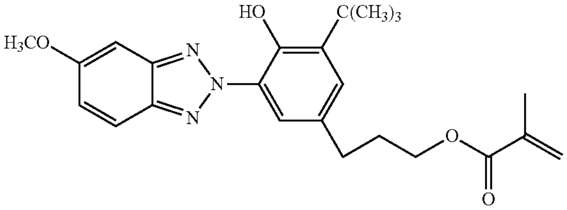

,

3-[3-(1,1-dimethylethyl)-4-hydroxy-5-[5-(trifluoromethyl)-2H-benzotriazol-2-yl]phenoxy]propyl ester 2-methyl-2-Propenoic acid, (UV23, CAS #2050905-16-1):

UV23

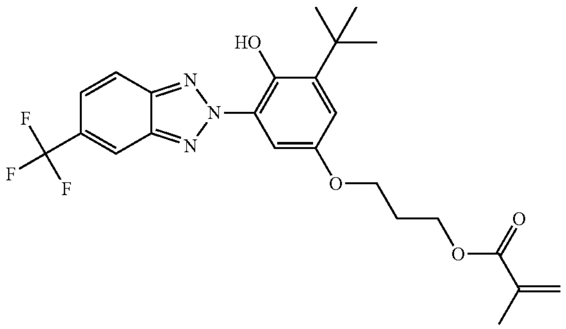

,

2-[2'-hydroxy-3'-tert-butyl-5'-(3"-methacryloyloxy-propoxy)phenyl]-5-chloro-2H-benzotriazole (UV28, CAS #275371-71-6):

UV28

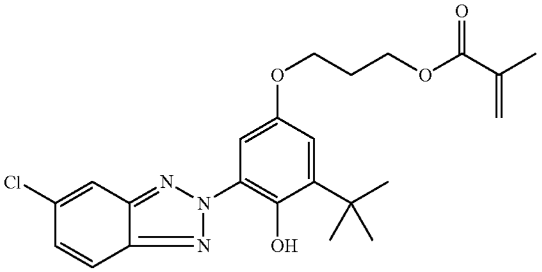

and

3-[3-(2H-benzotriazol-2-yl)-5-(1,1-dimethylethyl)-4-hydroxyphenoxy]propyl ester 2-methyl-,2-propenoic acid, (UV29, CAS #2254219-66-2):

UV29

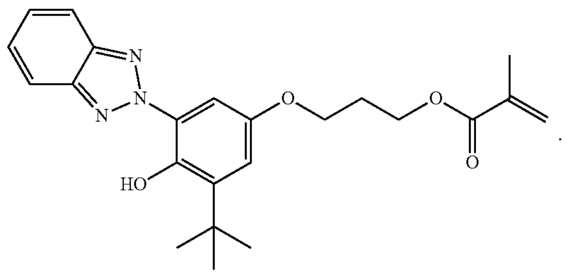

All the above HEVL absorbers are available from LYNN Laboratories, Inc. of 2797 Irving Blvd STE 110, Dallas, TX 75207.

The first HEVL absorber advantageously has an absorption cut off at a higher wavelength than the second HEVL absorber. For example, the highest wavelength at which a 0.003 wt % solution of the first HEVL absorber in ethyl acetate has an absorbance of 0.1, may be at a wavelength at least 5 nm, especially at least 10 nm higher than the highest wavelength at which a 0.003 wt % solution of the second HEVL absorber in ethyl acetate has an absorbance of 0.1. The first HEVL absorber advantageously has a greater level of absorbance in the 380 to 425 nm range than the second HEVL absorber, for example as a 0.003 wt % solution in ethyl acetate. The second HEVL absorber advantageously has a greater level of absorbance in the 350 to 375 nm range than the first HEVL absorber, for example as a 0.003 wt % solution in ethyl acetate.

The absorption spectra for 0.003 wt % solutions of the HEVL absorbers UV13 and UV28 in ethyl acetate are shown in FIG. 1. UV28 has an absorption cut off at a higher wavelength than UV13. The highest wavelength at which a 0.003 wt % solution of UV28 in ethyl acetate has an absorbance of 0.1 is 420 nm whereas the highest wavelength at which a 0.003 wt % solution of UV13 in ethyl acetate has an absorbance of 0.1 is 406 nm. UV28 has a greater level of absorbance in the 380 to 425 nm range than UV13 which has a greater level of absorbance in the 350 to 375 nm range than UV28.

The first and second HEVL absorber may be characterised in that in the absorption spectrum of a 0.003 wt % solution of the first and second HEVL absorbers in ethyl acetate, a tangent to the curve at the point defined by the highest wavelength at which absorbance is 0.5, crosses the 0.0 absorbance axis of the absorption spectrum of the first HEVL absorber is at a wavelength at least 5 nm longer, especially at least 10 nm longer, than the wavelength at which a tangent to the curve at the point defined by the highest wavelength at which absorbance is 0.5, crosses the 0.0 absorbance axis of the absorption spectrum of the second HEVL absorber. The first HEVL absorber may be characterised in that in the absorption spectrum of a 0.003 wt % solution of the first HEVL absorber in ethyl acetate, a tangent to the curve at the point defined by the highest wavelength at which absorbance is 0.5, crosses the 0.0 absorbance axis between 412 and 440 nm, between 415 and 435 nm, and preferably between 415 and 430 nm. The second HEVL absorber may be characterised in that in the absorption spectrum of a 0.003 wt % solution of the second HEVL absorber in ethyl acetate, a tangent to the curve at the point defined by the highest wavelength at which absorbance is 0.5, crosses the 0.0 absorbance axis at a shorter wavelength, for example a wavelength at least 5 nm shorter, especially at least 10 nm shorter, than the wavelength at which a tangent to the curve at the point defined by the highest wavelength at which absorbance is 0.5, crosses the 0.0 absorbance axis of the absorption spectrum of a 0.003 wt % solution of the first HEVL absorber in ethyl acetate. Alternatively or additionally, the second HEVL absorber may be characterised in that, in the absorption spectrum of a 0.003 wt % solution of the second HEVL absorber in ethyl acetate, a tangent to the curve at the point defined by the highest wavelength at which absorbance is 0.5, crosses the 0.0 absorbance axis between 385 and 415 nm, preferably between 390 and 412 nm.

As can be seen from FIG. 1, the tangent (A) to the point defined by the highest wavelength at which absorbance is 0.5 on the absorption spectrum of a 0.003 wt % solution of UV28 in ethyl acetate crosses the 0.0 absorbance axis at 422 nm. The tangent (B) to the point defined by the highest wavelength at which absorbance is 0.5 on the absorption spectrum of a 0.003 wt % solution of UV13 in ethyl acetate crosses the 0.0 absorbance axis at 407 nm.

The first HEVL absorber may be characterised in that the highest wavelength at which absorbance is 0.1 on the absorption spectrum of a 0.003 wt % solution of the first HEVL absorber in ethyl acetate, is between 412 and 440 nm, between 415 and 435 nm, and preferably between 415 and 430 nm. The second HEVL absorber may be characterised in that the highest wavelength at which absorbance is 0.1 on the absorption spectrum of a 0.003 wt % solution of the second HEVL absorber in ethyl acetate, is at a shorter wavelength, for example a wavelength at least 5 nm shorter, especially at least 8 nm shorter, than the wavelength at which the highest wavelength at which absorbance is 0.1 on the absorption spectrum of a 0.003 wt % solution of the first HEVL absorber in ethyl acetate. Alternatively or additionally, the second HEVL absorber may be characterised in that the highest wavelength at which absorbance is 0.1 on the absorption spectrum of a 0.003 wt % solution of the second HEVL absorber in ethyl acetate, is between 385 and 412 nm, preferably between 390 and 410 nm.

Figure 2:
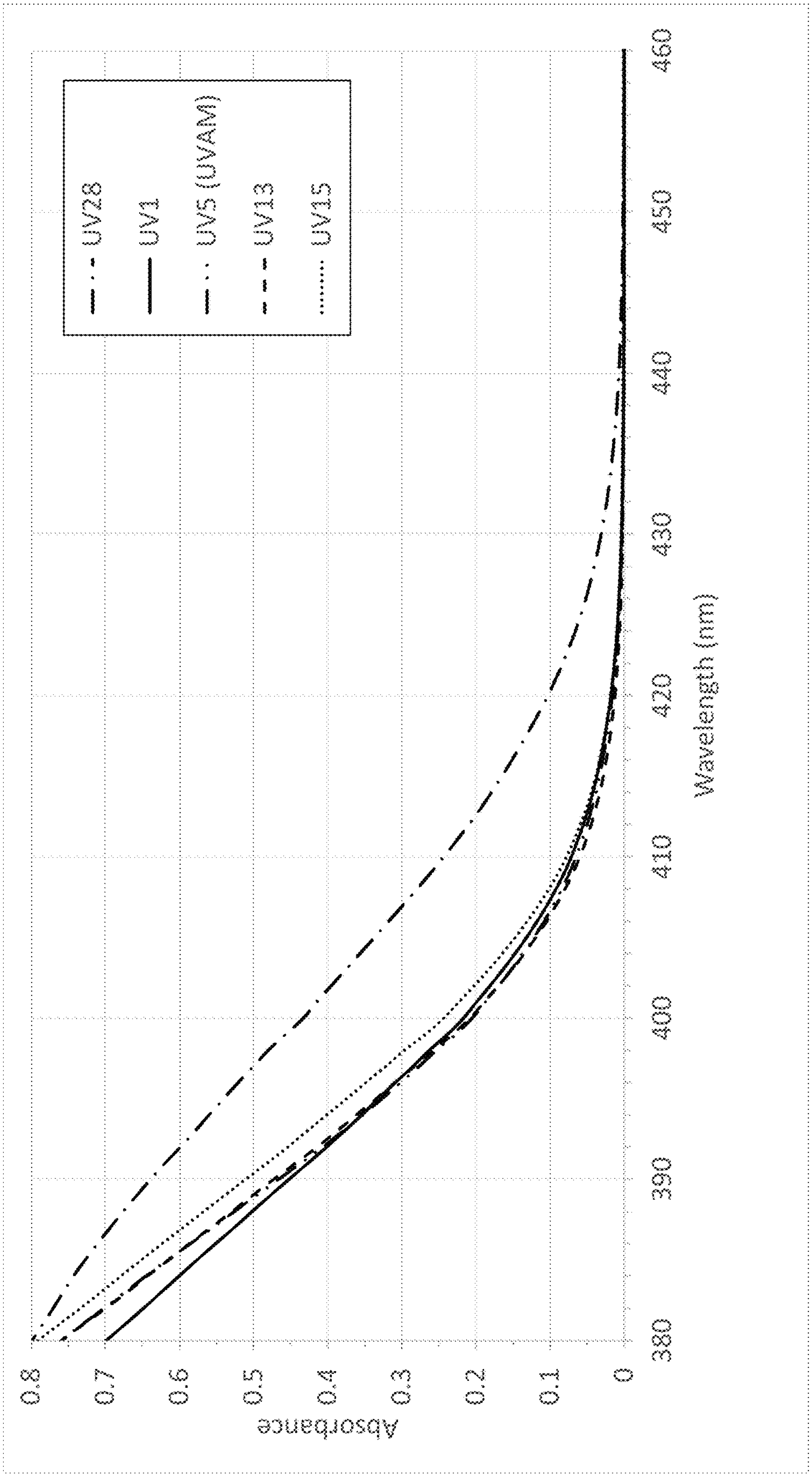
FIG. 2 shows light absorbance spectra for 0.003 wt % solutions of UV1, UV5 (UVAM), UV13, UV15 and UV28 in ethyl, acetate (≥99.8%, HPLC grade) with absorbance on the y-axis and the wavelength in nm on the x-axis.

As can be seen from FIG. 2, the highest wavelength at which absorbance is 0.1 on the absorption spectrum of a 0.003 wt % solution of UV28 in ethyl acetate, is 420 nm. The highest wavelength at which absorbance is 0.1 on the absorption spectrum of a 0.003 wt % solution of UV13 in ethyl acetate, is 406 nm, i.e. >8 nm shorter than the highest wavelength at which absorbance is 0.1 on the absorption spectrum of a 0.003 wt % solution of UV28 in ethyl acetate.

Advantageously, a 0.003 wt % solution in ethyl acetate of the first HEVL absorber has an absorbance peak in the range of 360 to 410 nm, such as 360 to 400 nm, especially 360 to 390 nm. Advantageously, a 0.003 wt % solution in ethyl acetate of the second HEVL absorber has a peak absorbance at a wavelength at least 5 nm shorter than the absorbance peak of a 0.003 wt % solution in ethyl acetate of the first HEVL absorber that falls in the range of 360 to 410 nm, for example between 5 and 25 nm shorter, especially between 5 and 15 nm shorter. Alternatively or additionally, a 0.003 wt % solution in ethyl acetate of the first HEVL absorber has an absorbance of light at a wavelength of 400 nm of at least 0.35 and/or an absorbance of light at a wavelength of 390 nm of at least 0.55, especially at least 0.57. Alternatively or additionally, a 0.003 wt % solution in ethyl acetate of the first HEVL absorber has an absorbance of light at a wavelength of 410 nm of at least 0.15, especially at least 0.20. A 0.003 wt % solution in ethyl acetate of the second HEVL absorber advantageously has an absorbance of light at a wavelength of 400 nm of below 0.30 and/or an absorbance of light at a wavelength of 390 nm of below 0.55, especially below 0.53. Alternatively or additionally, a 0.003 wt % solution in ethyl acetate of the second HEVL absorber has an absorbance of light at a wavelength of 410 nm of below 0.12, especially below 0.10. Advantageously, the wavelength at which a 0.003 wt % solution in ethyl acetate of the second HEVL absorber has an absorbance of 0.1 is at least 8 nm, especially at least 10 nm below that of the first HEVL absorber.

As can be seen from FIG. 1, a 0.003 wt % solution of UV28 in ethyl acetate has an absorbance peak at 368 nm and a 0.003 wt % solution of UV13 in ethyl acetate of the second HEVL absorber has an absorbance peak at 359 nm. As can be seen from FIG. 2, a 0.003 wt % solution of UV28 in ethyl acetate has an absorbance of about 0.43 for light at a wavelength of 400 nm and an absorbance of about 0.63 for light at a wavelength of 390 nm. A 0.003 wt % solution of UV1, UV5 (UVAM), UV13 and UV15 each have an absorbance of below 0.30 for light at a wavelength of 400 nm and an absorbance of 0.60 or below for light at a wavelength of 390 nm. The wavelength at which a 0.003 wt % solution of UV1, UV5 (UVAM), UV13 or UV15 in ethyl acetate has an absorbance of 0.1 is at least 10 nm below that of UV28.

It has been found that the inclusion of a combination of two HEVL absorbers meeting the above criteria in contact lens formulations results in lenses that are particularly effective in providing high levels of absorbance of violet-blue light in the 380-455 nm range. Furthermore, such a combination provides lenses that have a desirable colour without imparting an undesirable yellowing to the eye of a wearer. If, for example, the first HEVL absorber has a higher absorbance cut off, e.g. is an HEVL absorber characterised in that in the absorption spectrum of a 0.003 wt % solution of the HEVL absorber in ethyl acetate, a tangent to the curve at the point defined by the highest wavelength at which absorbance is 0.5, crosses the 0.0 absorbance axis above 440 nm, and/or the HEVL absorber may be characterised in that the highest wavelength at which absorbance is 0.1 on the absorption spectrum of a 0.003 wt % solution of the HEVL absorber in ethyl acetate is above 430 nm, the resulting lenses may have a greater yellowing effect and/or a greater amount of blue tinting agent may be required in the lens formulation to counter the yellowing effect of the first HEVL absorber. An example of a benzotriazole HEVL meeting the absorbance requirements set out above is UV28. An example of a less desirable HEVL absorber with a higher absorbance cut off is UV23.

Optionally at least one of the first and the second HEVL absorbers, especially the first HEVL absorber, is 2-[2'-hydroxy-3'-tert-butyl-5'-(3"-methacryloyloxypropoxy)phenyl]-5-chloro-2H-benzotriazole (UV28). UV28 may be present in the formulation in an amount of from 0.3% to 0.9% (wt/wt), preferably from 0.4% to 0.7% (wt/wt).

Optionally, the first HEVL absorber is UV28 and the second HEVL absorber is characterised in that the highest wavelength at which a 0.003 wt % solution of the second HEVL absorber in ethyl acetate has an absorbance of 0.1 is no more than 415 nm, especially no more than 410 nm. UV28 advantageously has a greater level of absorbance in the 380 to 425 nm range than the second HEVL absorber, for example as a 0.003 wt % solution in ethyl acetate. The second HEVL absorber advantageously has a greater level of absorbance in the 350 to 375 nm range than UV28, for example as a 0.003 wt % solution in ethyl acetate.

Optionally, the first HEVL absorber is UV28 and the second HEVL absorber is characterised in that a tangent to the highest wavelength at which absorbance is 0.5 on the absorption spectrum of a 0.003 wt % solution of the second HEVL absorber in ethyl acetate, crosses the 0.0 absorbance axis is at a shorter wavelength, for example a wavelength at least 5 nm shorter, especially at least 10 nm shorter, than the wavelength at which a tangent to the highest wavelength at which absorbance is 0.5 on the absorption spectrum of a 0.003 wt % solution of UV28 in ethyl acetate, crosses the 0.0 absorbance axis. Optionally, the first HEVL absorber is UV28 and the second HEVL absorber is characterised in that the highest wavelength at which absorbance is 0.1 on the absorption spectrum of a 0.003 wt % solution of the second HEVL absorber in ethyl acetate, is at a shorter wavelength, for example a wavelength at least 5 nm shorter, especially at least 8 nm shorter, than the wavelength at which the highest wavelength at which absorbance is 0.1 on the absorption spectrum of a 0.003 wt % solution of UV28 in ethyl acetate. Optionally, the first HEVL absorber is UV28 and a 0.003 wt % solution in ethyl acetate of the second HEVL absorber has a peak absorbance at a wavelength at least 5 nm shorter, preferably at least 7 nm shorter, optionally at least 8 nm shorter than the absorption peak of a 0.003 wt % solution in ethyl acetate of UV28 that falls in the range 360 to 380 nm.

Optionally, at least one of the first and the second HEVL absorbers, especially the second HEVL absorber, is selected from 2-(1,1-dimethylethyl)-4-[3-[(4-ethenyl phenyl) methoxy]propoxy]-6-(5-methoxy-2H-benzotriazol-2-yl)-phenol (UV1), 2-(5-chloro-2H-benzotriazol-2-yl)-6-(1,1-dimethylethyl)-4-ethenyl-phenol (UV5/UVAM), 2-[2'-hydroxy-3'-tert-butyl-5'-(3"-methacryloyloxypropoxy) phenyl]-5-methoxy-2H-benzotriazole (UV13) and 2-3'-t-butyl-2'-hydroxy-5'-(3"-dimethylvinylsilylpropoxy)-2'-hydroxy-phenyl)-5-methoxybenzotriazole (UV15). One of UV1, UV5, UV13 or UV15 or a combination of any of UV1, UV5, UV13 and UV15 may be present in an amount of from 0.5% to 2.2% (wt/wt), and preferably from 0.7% to 1.6% (wt/wt). The second HEVL absorber may be UV13. UV13 may be present in an amount of from 0.5% to 2.2% (wt/wt), and preferably from 0.7% to 1.6% (wt/wt).

The absorbance spectra of each of UV1 and UV15 are all very similar to that of UV13 (as shown in FIG. 1) having a maxima at about 360 to 365 nm. UV5 (UVAM) has a similar absorption profile to UV13 at wavelengths above 330 nm (e.g. between 330 and 500 nm) and also has second absorbance peak at about 310 nm and thus the absorption profile below 330 nm resembles that of UV28 (as shown in FIG. 1). Accordingly, in some embodiments of the invention, UV5 (UVAM) may be a particularly advantageous second HEVL absorber in preference to UV1, UV15 or UV13, for example, in formulations where enhanced levels of UV absorbance in the 300 to 320 nm range are required.

Optionally the first HEVL absorber is UV28 and the second HEVL light absorber is one of UV1, UV5, UV13 or UV15 or a combination of any of UV1, UV5, UV13 and UV15. One of UV1, UV5, UV13 or UV15 or a combination of any of UV1, UV5, UV13 and UV15 may be present in an amount of from 0.5% to 2.2% (wt/wt), and preferably from 0.7% to 1.6% (wt/wt); and UV28 may be present in an amount of from 0.3% to 0.9% (wt/wt), and preferably from 0.4% to 0.7% (wt/wt). Optionally the first HEVL absorber is UV28 and the second HEVL light absorber is UV13. UV13 may be present in an amount of from 0.5% to 2.2% (wt/wt), and preferably from 0.7% to 1.6% (wt/wt); and UV28 may be present in an amount of from 0.3% to 0.9% (wt/wt), and preferably from 0.4% to 0.7% (wt/wt).

Optionally, the total amount of HEVL absorbers of formula (1) present in the formulation of the invention does not exceed 2.7% (wt/wt), and preferably does not exceed 2.0% (wt/wt). Optionally the formulation of the invention comprises one of UV1, UV5, UV13 or UV15 or a combination of any of UV1, UV5, UV13 and UV15, especially UV13, in an amount of from 0.5% to 2.2% (wt/wt), and preferably from 0.7% to 1.6% (wt/wt); and comprises UV28 in an amount of from 0.3% to 0.9% (wt/wt), and preferably from 0.4% to 0.7% (wt/wt), wherein the total amount of HEVL absorbers of formula (1) present in the formulation does not exceed 2.7% (wt/wt) and preferably does not exceed 2.0% (wt/wt).

Optionally, the total amount in weight percent of units derived from HEVL absorbers of formula (1) present in the polymeric lens materials of the contact lenses of the third aspect of the invention are as set out above for formulations of the second aspect of the invention. For example, the total amount of units derived from high energy, short wavelength visible light absorbers of formula (1) present in the polymeric lens materials of the contact lenses of the third aspect of the invention optionally does not exceed 2.7% (wt/wt), and preferably does not exceed 2.0% (wt/wt), of the polymeric lens material.

The term "UV absorbing agent", refers to a compound that includes a chromophore that absorbs light in the UV spectrum, i.e. wavelengths in the range of 100-400 nm. In particular, a 0.003 wt % solution of a UV absorbing agent in ethyl acetate has an absorption maximum (λmax) in the range of 220-350 nm, especially in the range of 250-350 nm. The UV absorbing agent present in the formulation and lenses of the present invention advantageously has a maximum absorbance (λmax) in the 250 to 350 nm range, between 260 and 320 nm, especially between 270 and 310 nm, as a 0.003 wt % solution in ethyl acetate.

A compound may function as both a HEVL absorber and a UV absorbing agent. For example, a 0.003 wt % solution of UV28 in ethyl acetate has an absorption maximum (λmax) in the range of 220-350 nm at about 308 nm, has an absorption above 0.5 in the range of from about 288 to about 330 nm and from about 337 to about 397 nm, and has an absorption maximum (λmax) in the range of 350-455 nm at about 369 nm. The term "HEVL absorber" as used herein encompasses compounds that function solely as a HEVL absorber and compounds that function as both a HEVL absorber and a UV absorbing agent. The UV absorbing agent included in the formulations of the invention is favourably not a dual function HEVL absorber and UV absorbing agent. The UV absorbing agent may have an absorbance cut off below the visible range i.e. does not absorb significant amounts of light above 380 nm. For example, a 0.003 wt % solution of the UV absorbing agent in ethyl acetate does not have an absorbance of at least 0.5 within in the range of 375 nm to 450 nm. The first and/or second HEVL absorbers present in the formulations of the invention both have an absorption above 0.5 in the range of 375 nm to 450 nm as a 0.003 wt % solution in ethyl acetate, and may optionally also have an absorption maximum (λmax) in the range of 220-350 nm, especially in the range of 250-350.

Optionally, the hydrogel contact lens formulations of the invention can comprise one or more UV absorbing agents, i.e., the contact lens formulation can comprise an UV absorbing agent, or can comprise an UV absorbing agent component comprising two or more UV absorbing agents. UV absorbing agents that can be included in the formulations of the invention include, for example, benzophenones, or benzotriazoles, or any combination thereof.

UV absorbing agents are advantageously covalently bound to the polymeric matrix of the lens material instead of simply being physically entrapped in the material to prevent the absorbing agents from migrating, phase separating or leaching out of the lens material. Such stability is advantageous because leaching of the UV absorbing agent may present toxicological issues and/or lead to the loss of UV blocking activity of the contact lens. The UV absorbing agents used in the present invention are typically soluble in the contact lens formulation and are polymerizable so that they form part of the polymeric matrix of the lens and are retained in the lens during autoclaving and storage. The UV absorbing agent is advantageously a polymerizable UV absorbing agent that includes reactive group or groups capable of participating in a curing reaction by which the polymer matrix of the polymeric lens material is formed such that the polymerizable UV absorbing agent becomes covalently bound into the polymeric lens material. A polymerizable UV absorbing agent typically includes an ethylenically unsaturated group that is capable of participating in a radical polymerisation reaction, such as a vinyl or a (meth) acrylate, a (meth)acrylamide or a styrene group. Numerous co-polymerizable benzotriazole, benzophenone, methyl salicylate, acrylonitrile and triazine UV absorbing agents are known. Many of these UV absorbing agents contain ethylenically unsaturated polymerizable groups. Copolymerization with other ingredients of the lens formulation, typically with a radical initiator, incorporates the UV absorbing agents into the resulting contact lens material. Incorporation of additional functional groups on UV absorbing agent may influence one or more of the UV absorbing agent's UV absorbing properties, solubility or reactivity. Suitable polymerizable UV absorbing agents include 2-(4-benzoyl-3-hydroxyphenoxy)ethyl acrylate (CAS #16432-81-8, UV416) and "Norbloc", 2-(3-(2H-benzotriazol-2-yl)-4-hydroxy-phenyl)ethyl methacrylate (CAS #96478-09-0, NORBLOC 7966 from Noramco, Athens, GA., USA). The UV absorbing agent or UV absorbing agent component can be present in the formulations of the invention in an amount up to about 5.0% (wt/wt), typically in an amount of from about 0.1% (wt/wt), to about 2.0% (wt/wt), or from about 0.2% (wt/wt), to about 1.5% (wt/wt), such as from 0.3% (wt/wt) to 1.0% (wt/wt).

The hydrogel contact lens formulation of the second aspect of the invention or used in the method of the fourth aspect of the invention optionally further comprises a polymerizable UV absorbing agent which, as a 0.003 wt % solution in ethyl acetate, has a maximum absorbance (λmax) in the 250 to 380 nm range between 260 and 320 nm, especially between 270 and 310 nm. The UV light absorbing unit present in the polymeric lens material of the hydrogel contact lens of the third aspect of the invention may be derived from the polymerizable UV absorbing agents described herein with reference to the formulations of the invention. Thus, the polymeric lens material of the hydrogel contact lens of the third aspect of the invention optionally comprises a UV light absorbing unit derived from a polymerizable UV absorbing agent which, as a 0.003 wt % solution in ethyl acetate, has a maximum absorbance (λmax) in the 250 to 380 nm range between 260 and 320 nm, especially between 270 and 310 nm.

The hydrogel contact lens formulation of the second aspect of the invention or used in the method of the fourth aspect of the invention optionally further comprises a polymerizable UV absorbing agent comprising a benzophenone moiety. Likewise, the polymeric lens material of the hydrogel contact lens of the third aspect of the invention optionally further comprises a UV light absorbing unit comprising a benzophenone moiety. The UV light absorbing unit comprising a benzophenone moiety present in the polymeric lens materials of the third aspect of the invention may be derived from the polymerizable UV absorbing agents described herein with reference to the formulations of the invention.

The hydrogel contact lens formulation of the second aspect of the invention or used in the method of the fourth aspect of the invention optionally comprises a polymerizable UV absorbing agent comprising a benzophenone moiety which, as a 0.003 wt % solution in ethyl acetate, has a maximum absorbance (λmax) in the 250 to 380 nm range between 260 and 320 nm, especially between 270 and 310 nm. The UV light absorbing unit present in the polymeric lens materials of the third aspect of the invention may be derived from the polymerizable UV absorbing agents described herein with reference to the formulations of the invention. Thus, the polymeric lens material of the hydrogel contact lens of the third aspect of the invention optionally comprises a UV light absorbing unit derived from a polymerizable UV absorbing agent comprising a benzophenone moiety which, as a 0.003 wt % solution in ethyl acetate, has a maximum absorbance (λmax) in the 250 to 380 nm range between 260 and 320 nm, especially between 270 and 310 nm. The benzophenone UV absorbing agent included in the formulations of the invention favourably is not a dual function HEVL absorber and UV absorbing agent. The benzophenone UV absorbing agent may have an absorbance cut off below the visible range, i.e. the benzophenone UV absorbing agent does not absorb significant amounts of light above 380 nm. For example, a 0.003 wt % solution of the benzophenone UV absorbing agent in ethyl acetate does not have an absorbance of at least 0.5 within in the range of 375 nm to 450 nm.

It has been found that the inclusion of UV absorbing agents which, as a 0.003 wt % solution in ethyl acetate, has a maximum absorbance (λmax) in the 250 to 380 nm range between 260 and 320 nm, especially between 270 and 310 nm, and/or which comprise a benzophenone moiety in the formulation of the second aspect of the invention or used in the method of the fourth aspect of the invention enables the resulting lens to have a high level of absorption across the 250 to 455 nm range at lower overall levels of UV blockers than when UV absorbing agents which, as a 0.003 wt % solution in ethyl acetate, have a maximum absorbance (λmax) in the 250 to 380 nm range above 320 nm and/or which comprise a benzotriazole or triazine moiety, especially a benzotriazole moiety, are included. Without wishing to be bound by any theory, it is postulated that the combination of a benzophenone UV absorbing agent which, as a 0.003 wt % solution in ethyl acetate, has a maximum absorbance (λmax) in the 250 to 380 nm range between 260 and 320 nm, and two different HEVL absorbers each comprising a benzotriazole moiety is more effective in providing a blocking of light across the 260 to 440 nm range than a combination comprise a UV absorbing agent which has a maximum absorbance (λmax) in the 250 to 380 nm range above 320 and/or a benzotriazole moiety, such as Norbloc, due to the significant differences in absorption between the benzophenone UV absorbing agent and benzotriazole HEVL absorbers.

Optionally the formulations of the invention comprise one or more polymerizable UV absorbing agents comprising a benzophenone moiety in an amount not exceeding 1.5% (wt/wt), preferably not exceeding 1.0% (wt/wt). The polymerizable UV absorbing agent is optionally 2-(4-benzoyl-3-hydroxyphenoxy)ethyl acrylate (UV416).

The formulations of the present invention can also optionally include at least one tinting agent, i.e., one tinting agent or a tinting agent component comprising two or more tinting agents. In one example, the tinting agent can be a reactive dye or pigment effective to provide colour to the resulting lens or effective to reduce the amount of colouration of the resulting lens. The tinting agent or tinting agent component of the polymerizable formulations can comprise a polymerizable tinting agent, or can comprise a non-polymerizable tinting agent, or any combination thereof. The polymerizable tinting agent can be a tinting agent whose molecular structure comprises a polymerizable functional group, or can be a tinting agent whose molecular structure includes both a monomer portion and a dye portion, i.e., the tinting agent can be a monomer-dye compound. The molecular structure of the tinting agent may, for example, comprise a beta sulfone functional group, a triazine functional group or an anthraquinone moiety. Suitable tinting agents include, for example, VAT Blue 6 (7,16-dichloro-6,15-dihydroanthrazine-5,9,14,18-tetrone), 1-amino-4-[3-(beta-sulfatoethylsulfonyl)anilio]-2-anthraquinonesulfonic acid (C. I. Reactive Blue 19, RB-19) or a monomer-dye compound of Reactive Blue 19 and hydroxyethyl methacrylate (RB-19 HEMA), 1,4-bis [4-[(2-methacryl-oxyethyl)phenylamino] anthraquinone (Reactive Blue 246, RB-246, CAS #121888-69-5 available from Arran Chemical Company, Athlone, Ireland), 1,4-bis [(2-hydroxyethyl)amino]-9,10-anthracenedione bis(2-propenoic) ester (Reactive Blue 247, RB-247, CAS #109561-07-1 also available from Arran Chemical Company), or Reactive Blue 4 (RB-4, CAS #13324-20-4 available from ThermoFisher) or a monomer-dye compound of Reactive Blue 4 and hydroxyethyl methacrylate (RB-4 HEMA or "Blue HEMA"). Additional examples of suitable monomer-dye compounds are described in U.S. Pat. Nos. 5,944,853 and 7,216,975, both of which are incorporated in their entirety by reference herein. Other exemplary tinting agents are disclosed, for example, in US 2008/0048350 and U.S. Pat. No. 4,997,897 the disclosure of which is incorporated herein by reference in its entirety. The formulation of the invention advantageously comprises a blue or blue-green tinting agent comprising an anthraquinone moiety, especially a polymerizable blue or blue-green tinting agent comprising an anthraquinone moiety. The polymeric lens material of the contact lens of the invention may further comprising a unit derived from a polymerizable blue or blue-green tinting agent comprising an anthraquinone moiety. The polymerizable blue or blue-green tinting agent is optionally selected from 1,4-bis [4-(2-methacryloxyethyl) phenylamino]-9,10-anthraquinone (RB246) or 1,4-bis [(2-methacryloxyethyl)amino]-9,10-anthraquinone (RB247).

The radiation absorber package of HEVL absorbers together with optional UV absorbing agents and optional tinting agents may be selected such that the light transmission characteristics of a contact lens produced from a contact lens formulation comprising the radiation absorber package meets a required specification. For example, hydrogel contact lens formulation of the second aspect of the invention may include a radiation absorber package that results in a contact lens meeting the requirement for Class 1 UV blocking (defined in BS EN ISO 18369-2:2017, table 4), that is a contact lens able to block >90% of UVA rays and >99% of UVB rays, or Class 2 UV blocking, that is a contact lens that blocks >50% of UV-A rays and >95% of UV-B rays. Favoured formulations of the invention provides a contact lens that blocks at least 30% of HEVL, especially at least 40% of HEVL, preferably at least 45% of HEVL light in addition to providing UV blocking. The formulation may also provide a contact lens that blocks at least 35% of violet light, especially at least 45% of violet, preferably at least 50% of violet light. The contact lens of the third aspect of the invention advantageously meets the requirement for Class 1 UV blocking (defined in BS EN ISO 18369-2:2017, table 4), i.e. is able to block >90% of UVA rays and >99% of UVB rays, or Class 2 UV blocking, i.e. is able to block >50% of UV-A rays and >95% of UV-B rays. Favoured contact lenses of the invention block at least 30% of HEVL, especially at least 40% of HEVL, preferably at least 45% of HEVL light in addition to providing UV blocking. The contact lens of the invention may block at least 35% of violet light, especially at least 45% of violet, preferably at least 50% of violet light. "UVA" refers to radiation occurring at wavelengths between 315 and 400 nanometres (nm); "UVB" refers to radiation occurring between 280 and 315 nm; "Violet" refers to radiation occurring at wavelengths between 380 and 440 nm, and "high energy visible light" (HEVL) refers to radiation occurring at wavelengths between 380 and 455 nm.

The polymeric materials of the contact lens of the third aspect of the invention may have the following light transmission characteristics and/or the hydrogel contact lens formulation of the second aspect of the invention may result in a contact lens of a material meeting the following light transmission characteristics:

| | Transmission | Ranges of Transmission Characteristics* | |
|---|---|---|---|
| Blue light region | Characteristic | Minimum value | Maximum value |
| Blue-violet cutoff | 1% T | 410 nm | 430 nm |
| | 10% T | 420 nm | 440 nm |
| Mid-blue transition region | 440 nm | 10% T | 75% T |
| | 450 nm | 28% T | 80% T |
| | 460 nm | 40% T | 85% T |
| High transmission blue light region | 470 nm | 55% T | 95% T |
| | 480 nm | 68% T | 95% T |
| | 490 nm | 80% T | 95% T |
| | 500 nm | 85% T | 95% T. |

*determined by UV-Visible measurements in air.

Transmission characteristics of the lens materials were measured on 1×2 cm rectangular cast films of 1 mm thickness. The films were analysed by UV-Visible transmission spectroscopy from 300-800 nm using a Perkin-Elmer Lambda 35 instrument equipped with a Lab Sphere RSA-PE-20 integrating sphere.

The contact lens of the third aspect of the invention optionally has a yellowness index as determined by the ASTM E313-05 method of less than 8.0 preferably less than 6.0, especially less than 5.0. The hydrogel contact lens formulation of the second aspect of the invention optionally results in a hydrogel contact lens having a yellowness index as determined by the ASTM E313-05 method of less than 8.0, preferably less than 6.0, especially less than 5.0.

The contact lenses of the third aspect of the invention are hydrogel contact lenses, including conventional (i.e. non-silicone hydrogel contact lenses) and silicone hydrogel contact lenses. A "hydrogel" refers to a crosslinked polymeric material having a three-dimensional polymer network (i.e., polymer matrix) that is insoluble in water, but contains at least 10 percent by weight of water in its polymer matrix when it is fully hydrated. A "silicone hydrogel" refers to a hydrogel obtained by polymerization of a hydrogel contact lens formulation comprising at least one silicone-containing monomer. The term "non-silicone hydrogel" refers to a hydrogel free of silicone.

Polymerizable formulations suitable for use in preparing conventional hydrogel and silicone hydrogel contact lenses are well known in the art. The radiation absorber packages of the first aspect of the invention are suitable for incorporation into a wide range of polymerizable formulations for forming hydrogel, including silicone hydrogel, contact lenses. In addition to radiation absorbing compounds, the hydrogel contact lens formulations of the second aspect of the invention include monomers and other components suitable for forming hydrogel contact lenses as described below.

Typically hydrogel contact lenses are formed through free-radical propagated reactions involving the polymerisation of terminal ethylenically unsaturated groups, also referred to herein as "polymerizable groups". Exemplary polymerizable groups include (meth)acryl, (meth)acrylamide, allyl and vinyl and styrenyl groups. As used herein, a "vinyl-containing monomer" is any non-siloxane monomer that has a single polymerizable carbon-carbon double bond (i.e., a vinyl group) present in its molecular structure, where the carbon-carbon double bond of the vinyl group is attached to an sp3 hybridized carbon atom. A vinyl group is less reactive than the carbon-carbon double bond present in an acrylate or a methacrylate polymerizable group under free radical polymerization. The term "(meth)acrylamide" refers to methacrylamide and/or acrylamide. The term "(meth) acrylate" refers to methacrylate and/or acrylate. The term "terminal (meth)acryl group" refers to one (meth)acryl group at one of two ends of the main chain (or backbone) of an organic compound. An "N-vinyl amide monomer" refers to an amide compound having a vinyl group $CH{=}CH_2$ that is directly attached to the nitrogen atom of the amide group.

A "monomer" is a molecule having one or more polymerizable groups that can react together with other monomers that are the same or different to form a larger polymer or copolymer chain or three-dimensional polymeric matrix in a polymerization process. A monomer having two or more polymerizable groups can be referred to as a "cross-linking agent", as described further below. The term "monomer" encompasses macromonomers and polymerizable oligomers, i.e. polymerizable molecules that contain one or more chains of repeating units such as polymerizable polysiloxanes; thus, there is no size-constraint (i.e. maximum molecular weight) of the monomer unless indicated otherwise. As used in this application, the term "molecular weight" of a polymeric material refers to the absolute number average molecular weight (in units of daltons), for example as determined by 1H NMR end-group analysis or by GPC using polystyrene standards, unless otherwise specified. The term "polymer" refers a material formed by polymerizing and/or crosslinking one or more monomers.

The formulations of the invention typically comprise hydrophilic monomers and may also comprise hydrophobic monomers. As used herein, a "hydrophilic monomer" refers to a silicone-free monomer in which at least 50 grams of the monomer are fully soluble in 1 litre of water at 20° C. (i.e., ~5% soluble in water) as determined visibly using a standard shake flask method.

The hydrogel contact lens formulation of the invention typically comprises at least one hydrophilic monomer, optionally in an amount of at least 25% (wt/wt), such as in an amount of at least 30% (wt/wt), especially in an amount of at least 35% (wt/wt).

Suitable hydrophilic monomers include hydrophilic vinyl amide-containing monomers and hydrophilic vinyl ether-containing monomers. In some examples, the hydrophilic vinyl amide-containing monomers can be selected from N-vinyl-N-methyl acetamide (VMA), or N-vinyl pyrrolidone (NVP), or N-vinyl formamide, or N-vinyl acetamide, or N-vinyl-N-ethyl acetamide, or N-vinyl isopropylamide, or N-vinyl caprolactam, or N-vinyl-N-ethyl formamide, or any combination thereof. In some examples, the hydrophilic vinyl amide-containing monomer consists of VMA or NVP, or a combination of VMA and NVP. The vinyl ether-containing monomers can be selected from 1,4-butanediol vinyl ether (BVE), or ethylene glycol vinyl ether (EGVE), or diethylene glycol vinyl ether (DEGVE), or 1,4-cyclohexanedimethanol vinyl ether (CHDMVE), or a poly(ethylene glycol) vinyl ether having from 4 to 10 ethylene glycol units, or a poly(ethylene glycol) vinyl ether having more than 10 ethylene glycol units, or any combination thereof. In some examples, the vinyl ether-containing monomer can be a poly(ethylene glycol) vinyl ether having at least 1, 2, or 3 ethylene glycol units and up to 4, 6, 8, or 10 ethylene glycol units. One or more vinyl-containing monomers, in addition to the hydrophilic vinyl amide-containing monomers and hydrophilic vinyl ether-containing monomers, may be included in the formulations of the invention. For example, vinyl monomers having a vinyl ester or allyl ester polymerizable group may be included in the formulations of the invention in addition to the vinyl amide-containing monomers and vinyl ether-containing monomers. The hydrophilic monomer may be a (meth)acrylate or (meth)acrylamide group-containing hydrophilic monomer, examples of which include 2-hydroxyethyl methacrylate (HEMA), 4-hydroxybutyl acrylate glycerol methacrylate, 2-hydroxyethyl methacrylamide, ethoxyethyl methacrylamide (EOEMA), polyethyleneglycol monomethacrylate, methacrylic acid (MA) and acrylic acid.

The formulation of the second aspect of the invention may include at least one hydrophilic N-vinyl amide monomer, optionally in an amount of at least 20% (wt/wt), such as in an amount of at least 30% (wt/wt), especially in an amount of at least 35% (wt/wt). The formulation of the second aspect of the invention may include at least one hydrophilic N-vinyl amide monomer in an amount of from 25% to 55% (wt/wt), especially from 30% to 50% (wt/wt). The formulation of the second aspect of the invention may include N-methyl N-vinyl acetamide in an amount of from 25% to 55% (wt/wt), especially from 30% to 50% (wt/wt).

The polymerizable monomers may optionally include hydrophobic monomers. The term "hydrophobic monomer", as used herein, refers to a monomer that lacks siloxane groups and which is less than 5% soluble in water at 20° C. as determined using a standard shake flask method.

Hydrophobic monomers that lack siloxane groups may be (meth)acrylate group-containing hydrophobic monomers. As used herein, a "hydrophobic acrylate-containing monomer" is any non-siloxane monomer that has a single polymerizable acrylate group (e.g. methyl methacrylate, acrylamide, etc.). In a specific example, the hydrophobic acrylate-containing monomer has a polymerizable methacrylate group. Numerous suitable acrylate-containing monomers are known in the field. Exemplary hydrophobic acrylate-containing monomers include methyl acrylate, isopropyl acrylate, cyclohexyl acrylate, methyl methacrylate (MMA), butyl acrylate, tert-butyl methacrylate (tBMA), perfluorohexylethylthiocarbonylaminoethyl methacrylate, isobornyl methacrylate (IBM), trifluoroethyl methacrylate, hexafluoroisopropyl methacrylate, hexafluorobutyl methacrylate, 2-hydroxybutyl methacrylate (HOB), 2-hydroxypropyl methacrylate (HPMA) and ethylene glycol methyl ether methacrylate (EGMA). Favoured non-siloxane hydrophobic monomers include hydroxybutyl methacrylate, isobornyl methacrylate or a combination of hydroxybutyl methacrylate and isobornyl methacrylate. A hydrogel contact lens formulation may comprise an acrylate-containing hydrophobic monomer to further enhance mechanical strength and/or stiffness of the lens, or confer other desired properties.

Hydrophobic monomers that lack siloxane groups are not restricted to (meth)acrylate group-containing monomers and may comprise vinyl or other ethylenically unsaturated reactive groups. Further examples of hydrophobic monomers include vinyl acetate, vinyl propionate, vinyl butyrate, styrene, chloroprene, vinyl chloride, vinylidene chloride, acrylonitrile, and methacrylonitrile.

The formulation may comprise from about 2% to about 20% (wt/wt), such as 4% to 16% (wt/wt) especially 6% to 12% (wt/wt) of a non-siloxane hydrophobic monomer component. From 2 to 20% (wt/wt), especially from 5 to 15% (wt/wt) of the formulation may be hydroxybutyl methacrylate, isobornyl methacrylate or a combination of hydroxybutyl methacrylate and isobornyl methacrylate.

The hydrogel contact lens formulation of the second aspect and/or used in the method of the fourth aspect of the invention may be a silicone hydrogel contact lens formulation that comprises siloxane containing monomers in addition to the hydrophilic monomers and optional hydrophobic monomers that lack siloxane groups. The hydrogel contact lens of the third aspect of the invention may be a silicone hydrogel contact lens that comprises siloxane groups in the matrix of the polymeric lens material. A "siloxane monomer", as used herein, refers to a monomer having at least one siloxane group. The siloxane monomers may comprise a terminal acrylate or methacrylate group. (Meth)acrylate-containing siloxane monomers that can be used in the formulations of the invention described herein are well-known in the field. The siloxane monomers may be mono-functional (meth)acrylate-containing siloxanes, di-functional (meth)acrylate-containing siloxane, or comprise a combination of mono- and di-functional (meth)acrylate-containing siloxane monomers. In examples where the (meth)acrylate-containing siloxane monomers consist of one or more mono-functional (meth)acrylate-containing siloxane monomers (i.e. it does not contain any multi-functional (meth)acrylate-containing siloxane monomers), the silicone hydrogel contact lens formulation will typically further comprise a (meth)acrylate-containing cross-linking agent, described further below. In a specific example, the (meth)acrylate-containing siloxane monomer has one or more polymerizable methacrylate groups. Various non-limiting examples of suitable acrylate-containing siloxane monomers include 3-[tris(trimethylsiloxy) silyl]propyl methacrylate ("TRIS"), 3-methacryloxy-2-hydroxypropyloxy) propylbis(trimethylsiloxy)methylsilane ("SiGMA"), methyldi (trimethylsiloxy) sylylpropylglycerolethyl methacrylate ("SiGEMA"), and monomethacryloxypropyl functional polydimethylsiloxanes such as MCR-M07 and MCS-M11, all available from Gelest (Morrisville, PA, USA).

The hydrogel contact lens formulation of the second aspect of the invention is optionally a silicone hydrogel contact lens formulation comprising at least one polymerizable siloxane monomer, optionally in an amount of at least 25% (wt/wt), such as in an amount of at least 35% (wt/wt), especially in an amount of at least 40% (wt/wt).

The silicone hydrogel contact lens formulation may include at least one di-functional siloxane having a molecular weight of at least 5,000 daltons, especially at least one di-functional siloxane having a molecular weight of at least 8,000 daltons. The di-functional siloxanes typically have molecular weight of less than 25,000 daltons, such as a molecular weight of less than 20,000 daltons, especially a molecular weight of less than 15,000 daltons. It has been found that including siloxanes having higher molecular weights can result in formulations that have an unacceptably high viscosity. The silicone hydrogel contact lens formulation may include at least one di-functional siloxane having a molecular weight of from 5,000 to 25,000 daltons, for example at least one di-functional siloxane having a molecular weight of from 6,500 to 20,000 daltons, especially at least one di-functional siloxane having a molecular weight of at least 8,000 to 15,000 daltons. Advantageously, at least 30% (wt/wt) of the siloxane content may be di-functional siloxanes having a molecular weight of at least 5,000 daltons or at least 8,000 daltons, e.g. from 8,000 to 20,000 daltons. Favourably, at least 40% (wt/wt) of the siloxane content is di-functional having a molecular weight of at least 5,000 daltons or at least 8,000 daltons, e.g. from 8,000 to 20,000 daltons. The formulation advantageously comprises between 15 and 45 wt % di-functional siloxane, for example, between 20 and 40 wt % di-functional siloxane having a molecular weight of at least 5,000 daltons or at least 8,000 daltons, e.g from 8,000 to 20,000 daltons. In some embodiments, the silicone hydrogel contact lens formulation may include at least one di-functional siloxane having a molecular weight of at least 10,000 daltons. At least 30% (wt/wt) of the siloxane content may be di-functional siloxanes having a molecular weight of at least 10,000 daltons, or least 40% (wt/wt) of the siloxane content is di-functional having a molecular weight of at least 10,000 daltons. The formulation may comprise between 15 and 45 wt % di-functional siloxane, for example, between 20 and 40 wt % di-functional siloxane having a molecular weight of at least 10,000 daltons. The silicone hydrogel contact lens formulation may include at least one mono-functional siloxane monomer, for example, having a molecular weight of less than 3000 daltons. At least 20% (wt/wt) of the siloxane content may be mono-functional siloxanes having a molecular weight of less than 3000 daltons. Advantageously, at least 30% (wt/wt) of the siloxane content is mono-functional having a molecular weight of less than 3000 daltons. The formulation may comprise between 10 and 30 wt % mono-functional siloxane monomer(s), for example, between 10 and 30 wt % mono-functional siloxane monomer(s) having a molecular weight of less than 3000 daltons. The mono-functional siloxanes typically have a molecular weight of at least 200 daltons.

In one example, the mono-functional siloxane monomer may comprise a (meth)acrylate-containing siloxane monomer represented by formula (I), (I)

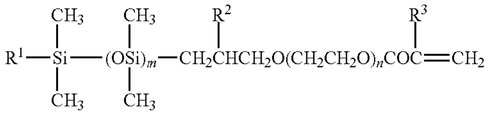

where m is an integer from 3 to 10, n is an integer from 0 to 10, $R^1$ is an alkyl group having 1 to 4 carbon atoms, $R^2$ is hydrogen or a methyl group, and $R^3$ is hydrogen or a methyl group. In a further specific example, the acrylate-containing siloxane monomer is represented by formula I wherein $R^1$ is a butyl group, $R^2$ is hydrogen, $R^3$ is a methyl group, m is 4, and n is 1. Methods of making siloxane monomers represented by formula (I) are described in U.S. Publ. no. 20090299022, incorporated herein by reference.

In another example, the mono-functional siloxane monomer may comprise a (meth)acrylate-containing siloxane monomer represented by formula (II), (II)

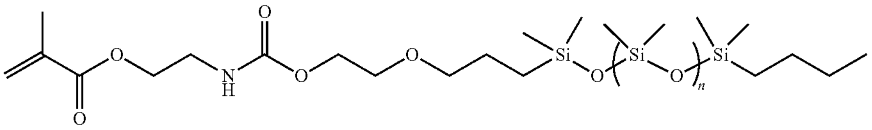

where n is an integer from about 10 to 15. Siloxane monomers of formula II and other suitable monomers are described in U.S. Pat. Nos. 6,867,245 and 6,310,169, both incorporated herein by reference.

Examples of suitable commercially available mono-functional siloxane monomers include 2-propenoic acid, 2-methyl-, 2-[3-(9-butyl-1,1,3,3,5,5,7,7,9,9-decamethylpentasiloxane-1-yl) propoxy]ethyl ester, X-22-1622 (also referred to as KF1622) available from Shin-Etsu Chemical Co., Ltd., Tokyo, Japan (CAS #1052075-57-6), the methacryloxypropyl terminated poly(dimethyl) siloxane FMM Shin-Etsu Silicones of America, Akron, Ohio, USA (CAS #697234-76-7) and 3-methacryloxy-2-hydroxypropyloxy) propylbis(trimethylsiloxy)methylsilane SIGMA.

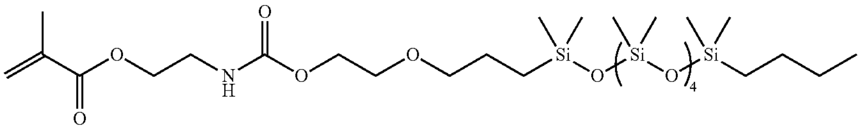

FMM, Mw = 1,500

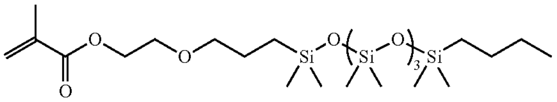

X-22-1622, Mw = 582

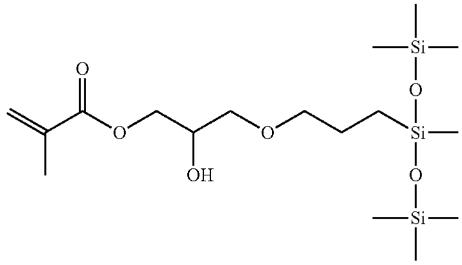

SIGMA

The silicone hydrogel contact lens formulation may include at least one di-functional siloxane monomer, for example, having a molecular weight of at least 8,000 daltons. The formulation may comprise between 10 and 45 wt % di-functional siloxane monomer(s), especially between 20 and 40 wt % di-functional siloxane monomer(s). The formulation advantageously comprises between 10 and 45 wt % or between 20 and 40 wt % di-functional siloxane monomer(s) having a molecular weight of at least 8,000 daltons. The formulation may comprise between 10 and 45 wt % or between 20 and 40 wt % di-functional siloxane monomer(s) having a molecular weight of at least 10,000 daltons.

In one example, the di-functional siloxane monomer may comprise a (meth)acrylate-containing siloxane monomer represented by formula (III), (III)

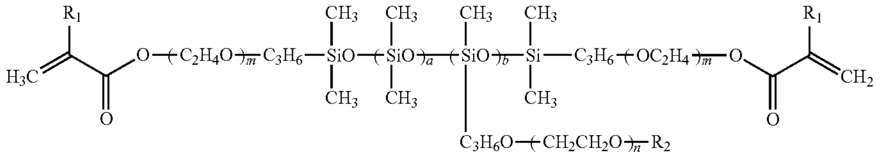

wherein $R^1$ is selected from either hydrogen or a methyl group; $R^2$ is selected from either hydrogen or a $C_{1-4}$ hydrocarbon group; m represents an integer of from 0 to 10; n represents an integer of from 4 up to about 15, 25, or 100; a and b represent integers of 1 or more; a+b is equal to 20-500; b/(a+b) is equal to 0.01-0.22; and the configuration of siloxane units includes a random configuration. In a more specific example, the acrylate-containing siloxane monomer is represented by formula II wherein $R^1$ and $R^2$ are methyl groups, m is 0, n represents an integer from about 5 to about 10, a represents an integer of from about 70 to about 90, and b represent an integer of from 1 to about 10; this siloxane monomer has a molecular weight of about 8,000 to about 10,000 daltons. Methods of making compounds of formula III are described in US 2009/0234089, incorporated herein by reference. A particularly suitable di-functional siloxane monomers is the PEG-functionalised poly(dimethyl) siloxane dimethacrylate monomer M5A (CAS #1216820-69-7) which is macromonomer A described in Example 2 of US 2009/0234089.

Other suitable di-functional siloxane monomers are represented by formula (IV):

(IV)

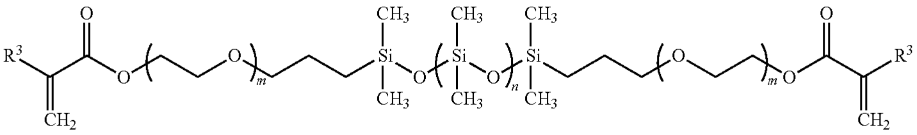

wherein $R^3$ is selected from either hydrogen or a methyl group, m represents an integer from 0 to 10, and n represents an integer from 1 to 500. In a specific example, the di-functional siloxane monomer is a methacryloxypropyl-terminated polydimethylsiloxane represented by formula IV where $R^3$ is a methyl group, m is 0, and n is an integer from 40 to 60 having a molecular weight of 4500 to 5500 is available from Gelest (Morrisville, PA, USA) and is referred to as "DMS-$R^{18}$" from the manufacturer. Additional suitable methacryloxypropyl-terminated polydimethylsiloxanes include DMS-$R^{22}$ and DMS-$R^{31}$, also available from Gelest.

Yet another suitable di-functional siloxane monomer is represented by formula (V), (V)

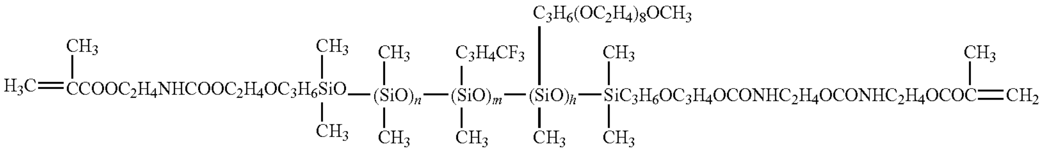

wherein n is an integer of about 100 to 150, m and p are both integers of about 5 to 10, and h is an integer of about 2 to 8. Methods of making compounds of formula V are described in U.S. Pat. No. 6,867,245, incorporated herein by reference. Additional (meth)acrylate-containing siloxane monomers that can be used in the formulations of the invention described herein are known in the field (see e.g. U.S. Pat. No. 7,572,841, U.S. Pat. No. 2006/0063852, and U.S. Pat. No. 5,998,498, each incorporated herein by reference).

In one example, the siloxane monomers may comprise a combination of a mono-functional (meth)acrylate-containing siloxane monomer and a di-functional (meth)acrylate-containing siloxane monomer. In one such example, the mono-functional (meth)acrylate-containing siloxane monomer has a molecular weight of less than 2,000, 1,000, or 750 daltons, and the di-functional acrylate-containing siloxane monomer has a molecular weight of at least 3,000, 5,000 or 8,000 daltons. In the case of polyorganosiloxane monomer, such as those represented by formulas II, IV, and V above, and other polydisperse monomers, the molecular weight may be determined by 1H NMR end-group analysis. In a specific example, the mono-functional (meth)acrylate-containing siloxane monomer has a molecular weight of from about 250 to about 1000, and the di-functional acrylate-containing siloxane monomer has a molecular weight of from about 5,000 to about 16,000 daltons. In a further specific example, the mono-functional (meth)acrylate-containing siloxane monomer has a molecular weight of from about 500 to about 1000 daltons, and the di-functional (meth)acrylate-containing siloxane monomer has a molecular weight of from about 5,000 to about 12,000 daltons.

The formulations of the invention typically comprise one or more polymerization initiators, i.e., the hydrogel contact lens formulations can comprise an initiator, or can comprise an initiator component comprising two or more polymerization initiators or a combination of polymerization initiators, synergists and activators. The term "initiator" refers to a chemical that initiates crosslinking/polymerizing reaction. The initiator is typically a free radical initiator that forms radicals that initiate radical propagated polymerisation reactions. Polymerization initiators that may be included in the formulations of the invention include, for example, azo compounds, or organic peroxides, or both. The initiator may be a photoinitiator that is activated on exposure to actinic radiation, such as UV light, or a thermal initiator that is activated on exposure to heat. Initiators that can be present in the hydrogel contact lens formulations include, for example, benzoin ethyl ether, or benzyl dimethyl ketal, or alpha, alpha-diethoxyacetophenone, or 2,4,6-trimethylbenzoyl diphenyl phosphine oxide, or benzoin peroxide, or t-butyl peroxide, or azobisisobutyronitorile, or azobisdimethylvaleronitorile, or any combination thereof. UV photoinitiators can include, for example, phosphine oxides such as diphenyl (2,4,6-trimethyl benzoyl) phosphine oxide, or benzoin methyl ether, or 1-hydroxycyclohexylphenyl ketone, or Darocur (available from BASF, Florham Park, N.J., USA), or Irgacur (also available from BASF), or any combination thereof. Advantageously the polymerization initiator is a thermal initiator. Examples of suitable thermal initiators include 2,2'-azobis-2-methyl propanenitrile also referred to as 2,2'-azobis(isobutyronitrile) (AIBN) (VAZO-64 from E.I. DuPont de Nemours & Co., Wilmington, Del., USA, CAS #78-67-1), 2,2'-azobis(2,4-dimethylpentanenitrile) also referred to as 2,2'-azobis(dimethylvaleronitrile) (VAZO-52 also from E.I. DuPont, CAS #4419-11-8) and 1,1'-azo bis(cyanocyclohexane) also referred to as 1,1'-azobis(cyclohexanecarbonitrile) (VAZO-88 also from E.I. DuPont, CAS #2094-98-6). The polymerization initiator or initiator component can be present in the hydrogel contact lens formulation in an amount from about 0.1% (wt/wt) to about 1.5% (wt/wt), or from about 0.2% (wt/wt) to about 1.0% (wt/wt), especially from about 0.2% (wt/wt) to about 0.8% (wt/wt). The hydrogel contact lens formulation of the second aspect of the invention is optionally a thermally cured formulation comprising at least one thermal initiator. The method of the fourth aspect of the invention optionally comprises thermally curing the formulation. Thermal curing or actinic curing methods are well-known to a person skilled in the art.

The hydrogel contact lens formulation of the invention may further comprise a cross-linking agent. A cross-linking agent can react with functional groups on two or more polymer chains so as to bridge one polymer to another. As used herein, a "cross-linking agent" is any compound having a molecular weight of less than about 2000 Daltons, typically less than 700 Daltons with two or more polymerizable groups. As used herein, "acrylate-containing cross-linking agent" has at least two polymerizable acrylate groups, and no other type of polymerizable group. A "vinyl-containing cross-linking agent" has at least two polymerizable vinyl groups, and no other type of polymerizable group. The vinyl-containing cross-linking agents, as well as the acrylate-containing cross-linking agents, typically can have a molecular weight of less than 1500, 1000, 500, or 250. Examples of vinyl-containing cross-linking agents that can be used in the formulations of the invention include, without limitation, divinyl ethers, or divinyl sulfones, or triallyl isocyanurates, and any combination thereof. Exemplary divinyl ethers include diethyleneglycol divinyl ether, or triethyleneglycol divinyl, or 1,4-butanediol divinyl ether, or 1,4-cyclohexanedimethanol divinyl ether, or any combination thereof. Typically, the vinyl-containing cross-linking agent can have two or three polymerizable vinyl groups. When present, the total amount of vinyl-containing cross-linking agent in the hydrogel contact lens formulation is typically from about 0.02, 0.04, or 0.06 mol. % up to about 0.10, 0.15, or 0.20 mol. %. Examples of acrylate-containing cross-linking agents that can be used in the formulations of the invention, include, without limitation, lower alkylene glycol di(meth)acrylate, poly(lower alkylene)glycol di(meth)acrylate, lower alkylene di(meth)acrylate, trimethylolpropane tri (meth)acrylate, pentaerythritol tetra(meth)acrylate, bisphenol A di(meth)acrylate, methylenebis(meth)acrylamide, and 1,3-bis(3-methacryloxypropyl)tetramethyldisiloxane. In certain examples the acrylate-containing cross-linking agent is a non-siloxane cross-linking agent. When present, the total amount of acrylate-containing cross-linking agent in the hydrogel contact lens formulation is typically from about 0.20, 0.25, 0.30, or 0.35 mol. % up to about 0.50, 0.60, 0.70, 0.80, or 1.0 mol. %. For the avoidance of doubt, multi-functional polymerizable compounds having a molecular weight of more than 2000 Daltons are not considered to be cross-linking agents. Thus di-functional siloxanes as described herein having a molecular weight of more than 2000 Daltons are not considered to be cross-linking agents.

The formulation of the invention may optionally further comprise a chain transfer agent. Chain transfer is a polymerization reaction in which the activity of a growing polymer chain is transferred to another molecule, reducing the average molecular weight of the final polymer. Examples of chain transfer agents include, for example, thiol compounds, halocarbon compounds or C3-C5 hydrocarbons, such as allyloxy ethanol.

The hydrogel contact lens formulation may comprise non-polymerizable ingredients, in addition to the polymerizable ingredients, that are conventionally used in contact lens formulations. Additional ingredients may also be included such as an organic diluent or an oxygen scavenger. Non-limiting examples of these and additional ingredients that may be included in the formulation of the invention are provided in US 2007/0296914.

Favoured formulations of the second aspect of the invention comprises at least one hydrophilic monomer, optionally in an amount of at least 25% (wt/wt). Favoured formulations optionally include at least one N-vinyl amide hydrophilic monomer, optionally in an amount of at least 15% (wt/wt). The favoured formulation is optionally a silicone hydrogel contact lens formulation comprising at least one polymerizable siloxane monomer, optionally in an amount of at least 25% (wt/wt). The favoured formulation is optionally a silicone hydrogel contact lens formulation comprising: a siloxane component present in an amount of at least 35% (wt/wt), wherein at least 40% of the siloxane content is di-functional siloxanes having a molecular weight of at least 8,000 Daltons; and an N-vinyl amide monomer component present in an amount of at least 37% (wt/wt).

A favoured formulation of the second aspect of the invention comprises from 25 wt % to 55 wt % of a siloxane monomer or a combination of siloxane monomers, from 30 wt % to 55 wt % of a vinyl monomer selected from NVP, VMA, or combinations thereof, and optionally from about 1 wt % to about 20 wt % of a hydrophilic monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt % to about 20 wt % of a hydrophobic monomer selected from methyl methacrylate (MMA), isobornyl methacrylate (IBM), or 2-hydroxybutyl methacrylate (HOB) or any combination thereof. Contact lens materials made from such formulations include stenfilcon A, comfilcon A, somofilcon A, fanfilcon A, and enfilcon A.

The contact lens of the third aspect of the invention favourably comprises a polymeric lens material derived from a favoured polymerizable formulation of the second aspect of the invention comprising a monomers and siloxane components described above. The monomers and siloxane components described above may be incorporated into the polymeric lens material in the amounts described above, e.g. at least 25% (wt/wt) of the polymeric material may be units derived from hydrophilic monomers having terminal ethylenically unsaturated polymerizable groups. The favoured formulations described above have been found to be particularly suitable for use in combination with the radiation absorber packages of the first aspect of the invention, i.e. for combining with a first HEVL absorber comprising a benzotriazole moiety, a second different HEVL absorber comprising a benzotriazole moiety, and optionally a polymerizable UV absorbing agent comprising a benzophenone moiety.

EXAMPLES

The following Examples illustrate certain aspects and advantages of the present invention, which should be understood not to be limited thereby.

Surface Wettability

The water contact angle on a contact lens is a measure of the surface wettability of a contact lens. As used herein, the contact angle of a lens-forming surface of a contact lens is determined by the sessile drop method using a DSA-100 Drop Shape Analysis System from Krüss, or equivalent analyzer, using 3 μl PBS dropped at the centre of the lens surface.

Equilibrium Water Content

The equilibrium water content (EWC) of contact lenses is determined as follows: Amount of water (expressed as percent by weight) present in a hydrated hydrogel contact lens, which is fully equilibrated in saline solution, is determined at room temperature (i.e. 20° C.). A stack of 5 lenses is placed in the pan on the analytical balance after blotting the lenses with a cloth and the hydrated weight of the lenses is determined. The lenses are then placed in a laboratory oven at 100±2° C. to dry for 16-18 hours then removed from the oven and cooled to room temperature in a desiccator for at least 30 minutes. The mass of the dry lenses is then determined and subtracted from the weight of the hydrated lens to calculate the water content.

Yellowness Index (YI)

The "yellowness index" (YI) is a quantifiable and standardized method of measuring the perceived yellowness of a sample from an observer's perspective that calculated from spectroscopic data. The YI of a sample describes the change in colour from colourless to yellow. A higher YI value indicates a stronger yellow colouration. YI of a contact lens may be determined using the protocol of ASTM E313-05 using a CIE-D65 light source with 1931 (2° viewing angle) standard illuminant factors.

The following examples illustrate effects of varying the amounts of high energy, short wavelength visible light absorbers and tinting agents present in a lens formulation while keeping the amounts of polymerizable monomers constant.

Cast Moulding of Contact Lenses

The hydrogel contact lens formulations described below were cast moulded by placing a volume of the composition on a female mould member and fitting a male mould member thereon to form a contact lens mould assembly. The female and male mould members were made from a non-polar resin (e.g. polypropylene). The formulation was thermally cured to form a polymeric lens body by placing the mould assembly in a nitrogen oven at the following cycle: 30 min. N2 purging at room temperature, 40 min. at 55° or 65° C., 40 min. at 80° C., and 40 min. at 100° C.

After curing, the male and female mould members were dry demoulded and the polymeric lens bodies were dry delensed from the male mould members. The delensed polymeric lens bodies were exposed to an extraction and hydration process consisting of soaking the lens bodies in denatured ethanol (Trade Specific Denatured Alcohol (TSDA) 7 comprising 5.0% vol. isopropanol) twice followed by soaking in a mixture of 50% denatured ethanol (TSDA7) and 50% deionised water and then soaking in deionised water three times.

The resulting contact lenses have an average centre thickness of 0.097 mm, diameter of 14 mm and a base curve of 8.3.

Base Lens Formulation

A base polymerizable silicone hydrogel contact lens formulation was prepared containing 10 parts hydrophobic monomers (consisting of 2.31 parts isobornyl methacrylate (IBM) and 7.69 parts hydroxybutyl methacrylate (HOB)), 43 parts hydrophilic monomers (consisting of 43 parts N-vinyl N-methyl acetamide (VMA)), 54 parts of polymerizable siloxanes (consisting of 19.98 parts FMM, 33.48 parts M5A and 0.54 parts KF1622) and 1.7 parts of other agents including a thermal initiator (AIBN) and a crosslinker (triallyl isocyanate). The same base formulation was used in all examples.

Lenses prepared from the base formulation without the addition of a radiation absorber package are optically clear, meaning that light transmittance between 381 nm to 780 nm was at least 97% (measured in accordance with ISO 18369).

Other suitable base formulations are described, for example, in EP 3 634 733 B1, including the formulations listed in Examples 4 to 24, the content of which is incorporated herein by reference.

Formulations Including UV13 Only

The radiation absorber packages of each of Examples 1 to 13 was added to the base formulation and cast moulded into lenses of the dimensions described above. The lenses of each of Examples 1-13 all had ophthalmically-acceptable surface wettability and a water content of 50 to 51 wt %.

The effect of adding differing amounts of UV13 to the base formulation was investigated in Comparative Examples 1 to 5 as shown in Table 1:

TABLE 1

| | Ex. 1 (comp.) | | Ex. 2 (comp.) | | Ex. 3 (comp.) | | Ex. 4 (comp.) | | Ex. 5 (comp.) | |
|---|---|---|---|---|---|---|---|---|---|---|
| Component | parts | wt % | parts | wt % | parts | wt % | parts | wt % | parts | wt % |
| Base formulation | 108.7 | 98.36% | 108.7 | 98.10% | 108.7 | 97.83% | 108.7 | 97.18% | 108.7 | 96.53% |
| UV416 | 0.9 | 0.81% | 0.9 | 0.81% | 0.9 | 0.81% | 0.9 | 0.80% | 0.9 | 0.80% |
| UV13 | 0.9 | 0.81% | 1.2 | 1.08% | 1.5 | 1.35% | 2.25 | 2.01% | 3 | 2.66% |
| RB246 | 0.009 | 0.01% | 0.009 | 0.01% | 0.009 | 0.01% | 0.009 | 0.01% | 0.009 | 0.01% |
| Total | 110.51 | | 110.81 | | 111.11 | | 111.86 | | 112.61 | |
| % Blocked 380-455 nm | | 35% | | 39% | | 42% | | 47% | | 50% |
| Sessile contact angle | | 21 | | 17 | | 17 | | 17 | | 16 |
| Yellowness index | | | | 1.33 | | | | | | 3.55 |
| Total % UV13 + UV28 | | 0.81% | | 1.08% | | 1.35% | | 2.01% | | 2.66% |

In order to achieve blocking of 50% of light having wavelengths between 380 and 455 nm, it was necessary to include high levels of UV13, i.e. greater than 2.5 wt %.

The yellowness index of lenses prepared from formulations of comparative Examples 2 and 5 demonstrates that increasing the amount of UV13 in the formulations increases the yellowness of lenses.

Formulations Including UV28 Only

The effect of adding differing amounts of UV28 to the base formulation was investigated in Comparative Examples 6 and 7 as shown in Table 2:

TABLE 2

| | Ex. 6 (comp.) | | Ex. 7 (comp.) | | Ex. 8 (Comp.) | |
|---|---|---|---|---|---|---|
| Component | parts | wt % | parts | wt % | parts | wt % |
| Base formulation | 108.7 | 98.67% | 108.7 | 97.87% | 108.7 | 98.27% |
| UV416 | 0.9 | 0.82% | 0.9 | 0.81% | 0 | 0 |
| Norbloc | 0 | 0 | 0 | 0 | 1.5 | 1.36% |
| UV28 | 0.55 | 0.50% | 1 | 0.90% | 0.4 | 0.36% |
| RB247 | 0.015 | 0.01% | 0.015 | 0.01% | 0.01 | 0.01% |
| total | 110.17 | | 111.62 | | 110.61 | |

TABLE 2-continued

| | Ex. 6 (comp.) | | Ex. 7 (comp.) | | Ex. 8 (Comp.) | |
|---|---|---|---|---|---|---|
| Component | parts | wt % | parts | wt % | parts | wt % |
| % Blocked 380-455 nm | | 40% | | 51% | | 35% |
| Sessile contact angle | 16 | | | | 15 | |
| Yellowness index | | 3.04 | | 6.49 | | 3.11 |
| Total % UV13 + UV28 | | 0.50% | | 0.90% | | 0.36% |

Incorporation of 0.5 wt % UV28 to the base formulation resulted in lenses that blocked 37% of light in the 380 to 455 nm range. Whereas increasing the amount of UV28 incorporated into the base formulation to 0.90 wt % resulted in blocking of 51% of light in the 380 to 455 nm range, at such UV28 loading it was found to be difficult to remove the lenses from the moulds and a low yield of acceptable lenses was obtained.

Comparative Example 8 incorporates the radiation absorber package of Example 2, Formulation IV of US2021/0181379 into lens formulations having the base formulation described above for comparison purposes. This resulted in lenses that blocked only 35% of light in the 380 to 455 nm range.

The yellowness index (YI) of lenses prepared from formulations of comparative Examples 6 and 7 demonstrates that increasing the amount of UV28 in the formulations increases the yellowness of lenses.

Formulations Including a Combination of UV13 and UV28

In Examples 9 to 13 radiation absorber packages that included both UV13 and UV28 were added to the same base silicone hydrogel contact lens formulation and the formulations cast into contact lenses of Table 3:

TABLE 3

| | Ex. 9 | | Ex. 10 | | Ex. 11 | | Ex. 12 | | Ex. 13 | |
|---|---|---|---|---|---|---|---|---|---|---|
| Component | parts | wt % | parts | wt % | parts | wt % | parts | wt % | parts | wt % |
| Base formulation | 108.7 | 98.14% | 108.7 | 97.60% | 108.7 | 97.47% | 108.7 | 97.38% | 108.7 | 96.91% |
| UV416 | 0.9 | 0.81% | 0.9 | 0.81% | 0.9 | 0.81% | 0.9 | 0.81% | 0.9 | 0.80% |
| UV13 | 0.6 | 0.54% | 1.2 | 1.08% | 1.2 | 1.08% | 1.2 | 1.08% | 2 | 1.78% |
| UV28 | 0.55 | 0.50% | 0.55 | 0.49% | 0.7 | 0.63% | 0.85 | 0.72% | 0.55 | 0.49% |
| RB247 | 0.015 | 0.01% | 0.015 | 0.01% | 0.015 | 0.01% | 0.015 | 0.01% | 0.015 | 0.01% |
| total | 110.77 | | 111.37 | | 111.52 | | 111.67 | | 112.17 | |
| % Blocked 380-455 nm | | 46% | | 50% | | 54% | | 55% | | 54% |
| Sessile CA | | 15 | | 15 | | 35 | | 31 | | 28 |
| Yellowness index | | 3.81 | | 4.14 | | 5.79 | | 6.49 | | 5.62 |
| Total % UV13 + UV28 | | 1.04% | | 1.57% | | 1.71% | | 1.80% | | 2.27% |

Example 9 shows that when UV13 is added to the formulation of comparative Example 6, which already included UV28, the resulting formulation provides enhanced blocking of transmission in the 380-455 nm range. Lenses formed from the formulation of Example 10 that include 1.08 wt % UV13 and 0.49 wt % UV28 block 50% of transmission in the 380-455 nm range, i.e. provide the same level of HEVL blocking as comparative Example 5 despite only including 60% of the total amount of benzotriazole HEVL blockers, thus illustrating that the use of a combination of benzotriazole HEVL blockers enables a greater degree of blocking to be achieved at lower overall loadings.

The formulation of Example 10 provided a good overall balance of properties, blocking 50% of HEVL in the 380-455 nm range, while keeping the overall amount of HEVL absorbers below 2 wt % of the total lens formulation. Increasing the amount of HEVL absorbers in Examples 11, 12 and 13 led to an increase in the amount of HEVL blocked by the lenses by up to a further 5%. However, the wettability of lenses cast from the formulations of Examples 11 to 13, as indicated by the sessile drop water contact angle, was lower than that of the lenses cast from the formulations of Examples 9 and 10.

Varying the UV Absorbing Agent

In Examples 14 to 17 radiation absorber packages that included HEVL absorbers and either the benzophenone UV absorbing agent UV416 or the benzotriazole UV absorbing agent Norbloc were added to the same base silicone hydrogel contact lens formulation and the formulations cast into contact lenses of Table 4:

TABLE 4

| | Ex. 14 | | Ex. 15 | | Ex. 16 | | Ex. 17 | |
|---|---|---|---|---|---|---|---|---|
| Component | parts | wt % | parts | wt % | parts | wt % | parts | wt % |
| Base formulation | 108.7 | 98.14% | 108.7 | 97.08% | 108.7 | 97.87% | 108.7 | 98.14% |
| UV416 | 0.3 | 0.27% | 0 | 0 | 0 | 0 | 0 | 0 |
| Norbloc | 0 | 0 | 1.5 | 1.34% | 0.6 | 0.54% | 0.3 | 0.27% |
| UV13 | 1.2 | 1.08% | 1.2 | 1.07% | 1.2 | 1.08% | 1.2 | 1.08% |
| UV28 | 0.55 | 0.50% | 0.55 | 0.49% | 0.55 | 0.50% | 0.55 | 0.50% |
| RB247 | 0.015 | 0.01% | 0.015 | 0.01% | 0.015 | 0.01% | 0.015 | 0.01% |
| total | 110.77 | | 111.97 | | 111.07 | | 111.07 | |
| % Blocked 380-455 nm | | 51% | | 51% | | | 51% | |
| Sessile CA | | 18 | | 22 | | | | |
| Yellowness index | | 4.60 | | 4.74 | | | | |
| Total UV + HEVL absorbers | | 1.85% | | 2.90% | | 2.12% | | 1.85% |
| Total % UV13 + UV28 | | 1.58% | | 1.56% | | 1.58% | | 1.58% |

Lenses of the formulation of Example 14 that contain UV416 exhibited Class 1 UV blocking and blocked 50% of transmission in the 380-455 nm range. The formulation of Example 17 is identical to that of Example 14 except that the UV absorber is changed from 0.3 parts by weight UV416 to 0.3 parts by weight Norbloc. The UV blocking of Example 17 was inferior to that of Example 14, notably the UVB blocking of Example 17 was inferior by >40% than the UVB blocking of Example 14. The inferior UV blocking in compositions of the invention comprising a benzotriazole UV absorbing agent, such as Norbloc, compared to formulations of the invention comprising the preferred benzophenone UV absorbing agents, such as UV416, means that Class 1 UV blocking across an entire range of contact lenses, especially those with low centre thicknesses, may not be consistently achieved at low loadings of the benzotriazole UV absorbing agent. Accordingly higher loadings of benzotriazole UV absorbing agents, as in Examples 15 and 16 may be required to achieve Class 1 UV blocking across the entire range of lenses. Conversely, in lens formulations of the invention comprising combinations of benzotriazole HEVL absorbers, lower amounts of benzophenone UV absorbing agents, such as UV416, may be required compared to benzotriazole UV absorbing agents, such as Norbloc, to produce lenses with desired light blocking characteristics.

Colouration of Lenses

The effect of including different radiation absorber packages in polymerizable lens formulations was investigated by placing a lens cast from the formulations on a glass eye having a blue iris. It was found that the colouration imparted by the lenses cast from formulations of comparative Example 1, comparative Example 6 and Example 10 of the invention resulted in a natural looking eye and superior in appearance to a commercially available Oasys MAX™ lens comprising a tricyclic HEVL absorber which imparted a significant undesired yellow/green coloured halo at the edge of the iris and onto the sclera of the glass eye. The YI of Acuvue Oasys Max™ lens was determined to be 6.95 and thus significantly higher than that of Example 10 of the present invention.

The increased amount of UV28 in the formulations of Example 11 and 12 compared to Examples 9 and 10 also resulted in a slight undesired yellowing of the glass eye, an observation that is consistent with the YI values reported in Table 3 above. Thus, it has been found that lenses with a YI of less than 6.0, especially less than 5.0 impart a more natural look to the eye than those having a YI of greater than 6.0.

Absorption Spectra

The absorption of light in the range of 250 to 500 nm was determined for solutions of Norbloc, UV416, UV13 and UV28 in ethyl acetate. The absorption spectrum for each compound is shown in FIG. 1. The solutions were all 0.003 wt % solutions prepared in ≥99.8%, HPLC grade ethyl acetate and the absorbance of the solutions from 250-800 mm was measured using a Perkin Elmer Lambda 365 spectrometer.

The absorption of light in the range of 380 to 460 nm was determined for solutions of UV1, UV5 (UVAM), UV13, UV15 and UV28 in ethyl acetate. The absorption spectrum for each compound is shown in FIG. 2. The solutions were all 0.003 wt % solutions prepared in ≥99.8%, HPLC grade ethyl acetate and the absorbance of the solutions from 250-800 mm was measured using a Perkin Elmer Lambda 365 spectrometer.

Without wishing to be bound by any theory, it is postulated that the use of two different high energy, short wavelength visible light absorber each comprising a benzotriazole moiety enables a more effective absorption of light in the range of 350 to 420 nm range due to differences in absorption maxima for the different compounds. The peak absorbance in the range of 350-455 nm for a solution of UV13 in ethyl acetate was found to be 359 nm and the peak absorbance in the range of 350-455 nm of a solution of UV28 was found to be 369 nm. UV13 was found to be more effective in absorbing light in the range of 340 to 375 nm whereas UV28 was found to be more effective in absorbing light in the range of 380 to 440 nm.

It is also postulated that the use of a benzophenone UV absorbing agent in combination with two different HEVL absorbers each comprising a benzotriazole moiety is more effective in providing a blocking of light across the 260 to 440 nm range than a combination comprising a benzotriazole UV absorbing agent due to the significant differences in absorption between benzophenone and benzotriazole compounds. As can be seen from FIG. 1, there is significant overlap between the absorption spectrum of the benzotriazole UV absorbing agent Norbloc and the benzotriazole HEVL absorbers UV13 and UV28, whereas the absorption spectrum of the benzophenone UV absorbing agent UV416 is complementary to that of UV13 and UV28 providing enhanced absorbance across a broader range of wavelengths.

The disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

The present invention includes the following aspects/embodiments/features in any order and/or in any combination:

1. A hydrogel contact lens formulation for forming the polymeric body of a hydrogel contact lens comprising:
   a first high energy visible light (HEVL) absorber comprising a benzotriazole moiety,
   a second different high energy visible light (HEVL) absorber comprising a benzotriazole moiety.
2. The formulation of 1, further comprising a polymerizable UV absorbing agent comprising a benzophenone moiety.
3. The formulation of 1 or 2, wherein the highest wavelength at which a 0.003 wt % solution in ethyl acetate of the second HEVL absorber has an absorbance of 0.1 is at least 10 nm below the highest wavelength at which a 0.003 wt % solution in ethyl acetate of the first HEVL absorber has an absorbance of 0.1.
4. The formulation of any of 1-3, wherein:
   a. the first HEVL absorber is characterised in that a tangent to the point on the curve defined by the highest wavelength at which absorbance is 0.5 crosses the 0.0 absorbance axis on the absorption spectrum of a 0.003 wt % solution of the first HEVL absorber in ethyl acetate, between 412 and 440 nm, preferably between 415 and 435 nm, especially between 415 and 430 nm; and the second HEVL absorber is characterised in that a tangent to the point on the curve defined by the highest wavelength at which absorbance is 0.5 crosses the 0.0 absorbance axis on the absorption spectrum of a 0.003 wt % solution of the second HEVL absorber in ethyl acetate, at a shorter wavelength, for example a wavelength at least 5 nm shorter, especially at least 10 nm shorter, than the wavelength at which a tangent to the point on the curve defined by the highest wavelength at which absorbance is 0.5 crosses the 0.0 absorbance axis on the absorption spectrum of a 0.003 wt % solution of the first HEVL absorber in ethyl acetate;

and/or b. the second HEVL absorber is characterised in that a tangent to the point on the curve defined by the highest wavelength at which absorbance is 0.5 crosses the 0.0 absorbance axis on the absorption spectrum of a 0.003 wt % solution of the first HEVL absorber in ethyl acetate, between 385 and 415 nm, preferably between 390 and 412 nm; and the second HEVL absorber is characterised in that a tangent to the point on the curve defined by the highest wavelength at which absorbance is 0.5 crosses the 0.0 absorbance axis on the absorption spectrum of a 0.003 wt % solution of the second HEVL absorber in ethyl acetate, at a shorter wavelength, for example a wavelength at least 5 nm shorter, especially at least 8 nm shorter, than the wavelength at which the highest wavelength at which absorbance is 0.5 on the absorption spectrum of a 0.003 wt % solution of the first HEVL absorber in ethyl acetate;

and/or c. the first HEVL absorber is characterised in that the highest wavelength at which absorbance is 0.1 on the absorption spectrum of a 0.003 wt % solution of the first HEVL absorber in ethyl acetate, is between 412 and 440 nm, preferably between 415 and 435 nm, especially between 415 and 430 nm; and the second HEVL absorber is characterised in that the highest wavelength at which absorbance is 0.1 on the absorption spectrum of a 0.003 wt % solution of the second HEVL absorber in ethyl acetate, is between 385 and 412 nm, preferably between 390 and 410 nm;

and/or d. a 0.003 wt % solution in ethyl acetate of the first HEVL absorber has an absorbance peak in the range of 360 to 410 nm and a 0.003 wt % solution in ethyl acetate of the second HEVL absorber has a peak absorbance at a wavelength at least 5 nm shorter than the absorbance peak of a 0.003 wt % solution in ethyl acetate of the first HEVL absorber that falls in the range 360 to 410 nm, for example between 5 and 25 nm shorter, especially between 5 and 15 nm shorter;

and/or e. a 0.003 wt % solution in ethyl acetate of the first HEVL absorber has an absorbance of light at a wavelength of 400 nm of at least 0.35 and/or an absorbance of light at a wavelength of 390 nm of at least 0.55; and a 0.003 wt % solution in ethyl acetate of the second HEVL absorber has an absorbance of light at a wavelength of 400 nm of below 0.30 and/or an absorbance of light at a wavelength of 390 nm of below 0.55.
5. The formulation of any of 1-4, wherein the first and second HEVL absorbers are each of formula (1):

(1)

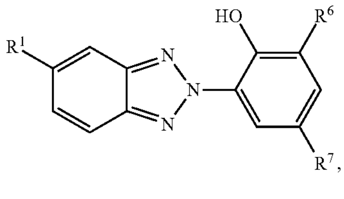

wherein:

$R^1$ is a halogen, OH, $C_{1-12}$ alkyloxy, -A-$R^9$—Y, optionally substituted $C_{1-12}$ alkyl, optionally substituted phenoxy, or optionally substituted napthyloxy, where the optional substituents are halogen, $C_{1-6}$ alkyl, $C_{1-6}$ alkoxy, OH, $—(CH_2CH_2O)_nH$, $—(CH_2CH_2O)_nCH_2CH_3$, $—(CH_2CH(CH_3)O)_nH$ or $—(CH_2CH(CH_3)O)_nCH_2CH_2(CH_3)$;

one of $R^6$ and $R^7$ is H or $C_{1-12}$ alkyl optionally substituted with halogen; and the other of $R^6$ and $R^7$ is:

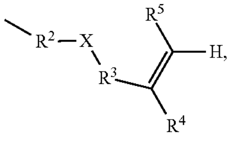,

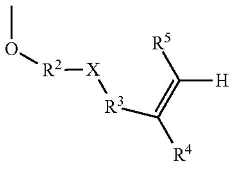

or —$OR^8$ in which:

$R^2$ is a bond, $C_{1-12}$ alkylene optionally substituted with —OH and/or interrupted by an ester group, $(CH_2CH_2O)_n$ or $(CH_2CH(CH_3)O)_n$;

$R^3$ is a bond, C(O), $C(O)C_jH_{2j}$, $C_{1-6}$ alkylene, phenyl or $C_{1-6}$ alkylphenyl;

X is a bond, O, $NR^4$, S or $(Si(CH_3)_2O)_mSi(CH_3)_2$;

each $R^4$ is independently H or methyl;

$R^5$ is H, $C_{1-6}$ alkyl or phenyl;

m is 0-9;

n is 2-10;

j is 1-6;

A is —S— or —$SO_2$—;

$R^8$ is H, $C_{1-12}$ alkyl, $C_{6-15}$ arylalkyl or —$R^9$—Z;

each $R^9$ is independently $C_{1-12}$ alkylene optionally substituted with —OH and/or interrupted by an ester group, each of Y and Z respectively is —OH, —OC(O) $R^{10}$, —$NH_2$, —NC(O) $R^{10}$, —NCO, —$CO_2H$, —$CO_2R^{10}$

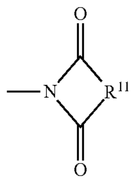 or 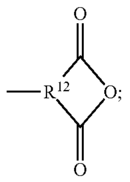

each $R^{10}$ is independently $C_{1-10}$ alkyl or $C_{3-10}$ alkenyl;

$R^{11}$ is $C_{3-10}$ cycloalkenylene; and $R^{12}$ is $C_{1-10}$ alkylene or 1,2-phenylene.

6. The formulation of 5, wherein the total amount HEVL absorbers of formula (1) present does not exceed 2.7% (wt/wt), preferably does not exceed 2.0% (wt/wt).

7. The formulation of any of 1-6, wherein: the first HEVL absorber is 2-[2'-hydroxy-3'-tert-butyl-5'-(3"-methacryloyloxypropoxy)phenyl]-5-chloro-2H-benzotriazole (UV28).

8. The formulation of any of 1-7, wherein the second HEVL absorber is selected from: 2-(1,1-dimethylethyl)-4-[3-[(4-ethenyl phenyl) methoxy]propoxy]-6-(5-methoxy-2H-benzotriazol-2-yl)-phenol (UV1), 2-(5-chloro-2H-benzotriazol-2-yl)-6-(1,1-dimethylethyl)-4-ethenyl-phenol (UV5/UVAM), 2-[2'-hydroxy-3'-tert-butyl-5'-(3"-methacryloyloxypropoxy)phenyl]-5-methoxy-2H-benzotriazole (UV13), 2-3'-tert-butyl-2'-hydroxy-5'-(3"-dimethylvinylsilylpropoxy)-2'-hydroxy-phenyl)-5-methoxybenzotriazole (UV15), especially 2-[2'-hydroxy-3'-tert-butyl-5'-(3"-methacryloyloxypropoxy)phenyl]-5-methoxy-2H-benzotriazole (UV13).

9. The formulation of any of 1-8, wherein the first HEVL absorber is present in an, amount of from 0.3% to 0.9% (wt/wt), preferably from 0.4% to 0.7% (wt/wt); and the second HEVL absorber is present in an amount of from 0.5% to 2.2% (wt/wt), preferably from 0.7% to 1.6% (wt/wt).

10. The formulation of any of 1-9, comprising a polymerizable UV absorbing agent comprising a benzophenone moiety in an amount not exceeding 1.5% (wt/wt), preferably not exceeding 1.0% (wt/wt).

11. The formulation of any of 1-10, wherein the polymerizable UV absorbing agent is 2-(4-benzoyl-3-hydroxyphenoxy)ethyl acrylate (UV416).

12. The formulation of any of 1-11, further comprising a polymerizable blue or blue-green tinting agent comprising an anthraquinone moiety.

13. The formulation of 12, wherein the polymerizable blue or blue-green tinting agent is selected from 1,4-bis [4-(2-methacryloxyethyl)phenylamino]-9,10-anthraquinone (RB246) or 1,4-bis [(2-methacryloxyethyl) amino]-9,10-anthraquinone (RB247).

14. The formulation of any of 1-13, which is a thermally cured formulation comprising at least one thermal initiator.

15. The formulation of any of 1-14, further comprising at least one hydrophilic monomer, optionally in an amount of at least 25% (wt/wt).

16. The formulation of 15, comprising at least one hydrophilic N-vinyl amide monomer, optionally in an amount of at least 15% (wt/wt).

17. The formulation of 16 comprising at least 30% (wt/wt) of hydrophilic N-vinyl amide monomer(s).

18. The formulation of any of 1-17, wherein the formulation is a silicone hydrogel contact lens formulation comprising a polymerizable siloxane component, optionally in an amount of at least 25% (wt/wt).

19. The formulation of 18, comprising from 30 to 60% (wt/wt) of a polymerizable siloxane component.

20. The formulation of 18 or 19, wherein at least 40% (wt/wt) of the polymerizable siloxane content is di-functional siloxanes having a molecular weight of at least 8,000 daltons, and wherein at least 25% (wt/wt) of the polymerizable siloxane content is mono-functional siloxanes having a molecular weight of less than 3000 daltons.

21. The formulation of any of 18-20, comprising:

a siloxane component present in an amount of at least 35% (wt/wt) based on the total weight of the formulation, wherein at least 40% of the siloxane content is di-functional siloxanes having a molecular weight of at least 8,000 daltons; and an N-vinyl amide monomer component present in an amount of at least 37% (wt/wt) based on the total weight of the formulation.

22. The formulation of any of 1-21 comprising at least 5% (wt/wt) based on the total weight of the formulation of non-siloxane hydrophobic monomers, especially hydrophobic methacrylate monomers.

23. The formulation of 22, wherein the hydrophobic monomers include hydroxybutyl methacrylate, isobornyl methacrylate or a combination of hydroxybutyl methacrylate and isobornyl methacrylate.

24. The formulation of any of 1-14 comprising:

a. hydrophilic N-vinyl amide monomer(s) in an amount of at least 30% (wt/wt), b. a polymerizable siloxane component in an amount of from 35 to 60% (wt/wt) of the total formulation, wherein at least 40% (wt/wt) of the polymerizable siloxane content is di-functional siloxanes having a molecular weight of at least 8,000 daltons, and wherein at least 25% (wt/wt) of the polymerizable siloxane content is mono-functional siloxanes having a molecular weight of less than 3000 daltons, and c. non-siloxane hydrophobic methacrylate monomers in an amount of at least 5% (wt/wt) based on the total weight of the formulation.

25. The formulation of any of 1-14 comprising:

a. N-methyl N-vinyl acetamide in an amount of from 30 to 50% (wt/wt) of the total formulation, b. di-functional, (meth)acrylate-containing siloxanes having a molecular weight of at least 8,000 daltons in an amount of from 20 to 40% (wt/wt) of the total formulation, c. mono-functional, (meth)acrylate-containing siloxanes having a molecular weight of less than 3000 Daltons in an amount of from 10 to 30 (wt/wt) of the total formulation, d. hydroxybutyl methacrylate, isobornyl methacrylate or a combination of hydroxybutyl methacrylate and isobornyl methacrylate in an amount of from 5 to 15% (wt/wt) of the total formulation.

26. The formulation of 24 or 25, wherein the di-functional siloxane monomer is a (meth)acrylate-containing siloxane monomer represented by formula (III), (III)

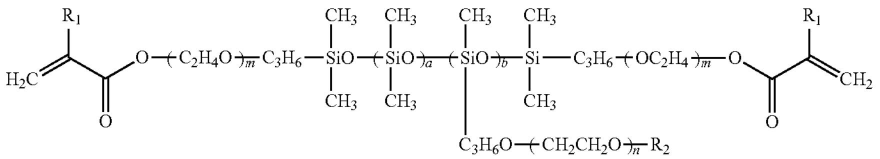

wherein $R^1$ is selected from either hydrogen or a methyl group; $R^2$ is selected from either hydrogen or a $C_{1-4}$ hydrocarbon group; m represents an integer of from 0 to 10; n represents an integer of from 4 up to about 15, 25, or 100; a and b represent integers of 1 or more; a+b is equal to 20-500; b/(a+b) is equal to 0.01-0.22; and the configuration of siloxane units includes a random configuration.

27. The formulation of any of 24-26, wherein the mono-functional siloxane monomer is a methacrylate-containing siloxane monomer represented by formula (II), (II)

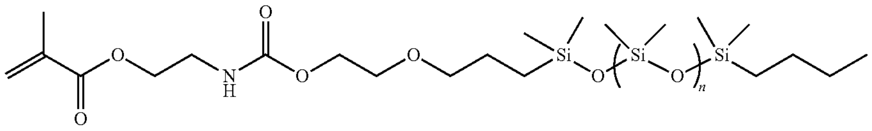

where n is an integer from about 10 to 15.

28. A hydrogel contact lens obtained from the polymerisation of the formulation of any of 1-27.

29. The contact lens of 28 having the following light transmission characteristics:

| Blue light region | Transmission Characteristic | Ranges of Transmission Characteristics* Minimum value | Maximum value |
|---|---|---|---|
| Blue-violet cutoff | 1% T | 410 nm | 430 nm |
| | 10% T | 420 nm | 440 nm |
| Mid-blue transition region | 440 nm | 10% T | 75% T |
| | 450 nm | 28% T | 80% T |
| | 460 nm | 40% T | 85% T |

-continued

| Blue light region | Transmission Characteristic | Ranges of Transmission Characteristics* Minimum value | Maximum value |
|---|---|---|---|
| High transmission blue light region | 470 nm | 55% T | 95% T |
| | 480 nm | 68% T | 95% T |
| | 490 nm | 80% T | 95% T |
| | 500 nm | 85% T | 95% T. |

*determined by UV-Visible measurements in air.

30. The contact lens of 28 or 29 having a yellowness index as determined by the ASTM E313-05 method of less than 6.0.

The entire contents of all cited references in this disclosure, to the extent that they are not inconsistent with the present disclosure, are incorporated herein by reference.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

The invention claimed is:

1. A hydrogel contact lens obtained from polymerization of a formulation, the formulation comprising:

a high energy visible light (HEVL) absorber component consisting of a first high energy visible light (HEVL) absorber, and a second different high energy visible light (HEVL) absorber, wherein the first HEVL is 2-[2'-hydroxy-3'-tert-butyl-5'-(3"-methacryloyloxypropoxy)phenyl]-5-chloro-2H-benzotriazole (UV28), and the second different HEVL is 2-[2'-hydroxy-3'-tert-butyl-5'-(3"-methacryloyloxypropoxy)phenyl]-5-methoxy-2-benzotriazole (UV13), the first HEVL absorber is present in an amount of from 0.4% to 0.7% (wt/wt) of the formulation and the second different HEVL absorber is present in an amount of from 0.7% to 1.6% (wt/wt) of the formulation, and a total amount of HEVL absorbers present in the formulation is from 1.56% to 1.8% (wt/wt).

2. The hydrogel contact lens of claim 1, wherein the formulation further comprises a polymerizable UV absorbing agent comprising a benzophenone moiety in an amount not exceeding 1.5% (wt/wt).

3. The hydrogel contact lens of claim 2, wherein the polymerizable UV absorbing agent is 2-(4-benzoyl-3-hydroxyphenoxy)ethyl acrylate (UV416).

4. The hydrogel contact lens of claim 1, wherein the formulation further comprises a polymerizable blue or blue-green tinting agent comprising an anthraquinone moiety.

5. The hydrogel contact lens of claim 4, wherein the polymerizable blue or blue-green tinting agent is selected from 1,4-bis [4-(2-methacryloxyethyl)phenylamino]-9,10-anthraquinone (RB246) or 1,4-bis [(2-methacryloxyethyl) amino]-9,10-anthraquinone (RB247).

6. The hydrogel contact lens of claim 1, wherein the formulation is a thermally cured formulation comprising at least one thermal initiator.

7. The hydrogel contact lens of claim 1, wherein the formulation further comprises at least one hydrophilic monomer in an amount of at least 25% (wt/wt).

8. The hydrogel contact lens of claim 1, wherein the formulation further comprises at least one hydrophilic N-vinyl amide monomer in an amount of at least 15% (wt/wt).

9. The hydrogel contact lens of claim 1, wherein the formulation further comprises at least 30% (wt/wt) of hydrophilic N-vinyl amide monomer(s).

10. The hydrogel contact lens of claim 1, wherein the formulation is a silicone hydrogel contact lens formulation comprising a polymerizable siloxane component in an amount of at least 25% (wt/wt).

11. The hydrogel contact lens of claim 10, wherein the formulation further comprises from 30 to 60% (wt/wt) of a polymerizable siloxane component.

12. The hydrogel contact lens of claim 10, wherein at least 40% (wt/wt) of the polymerizable siloxane content is di-functional siloxanes having a molecular weight of at least 8,000 daltons, and wherein at least 25% (wt/wt) of the polymerizable siloxane content is mono-functional siloxanes having a molecular weight of less than 3000 daltons.

13. The hydrogel contact lens of claim 10, wherein the formulation further comprises:

a siloxane component present in an amount of at least 35% (wt/wt) based on the total weight of the formulation, wherein at least 40% of the siloxane content is di-functional siloxanes having a molecular weight of at least 8,000 daltons; and an N-vinyl amide monomer component present in an amount of at least 37% (wt/wt) based on the total weight of the formulation.

14. The hydrogel contact lens of claim 1, wherein the formulation further comprises at least 5% (wt/wt) based on the total weight of the formulation of non-siloxane hydrophobic monomers.

15. The hydrogel contact lens of claim 14, wherein the hydrophobic monomers include hydroxybutyl methacrylate, isobornyl methacrylate or a combination of hydroxybutyl methacrylate and isobornyl methacrylate.

16. The hydrogel contact lens of claim 1, wherein the formulation further comprises:

a. hydrophilic N-vinyl amide monomer(s) in an amount of at least 30% (wt/wt), b. a polymerizable siloxane component in an amount of from 35 to 60% (wt/wt) of the total formulation, wherein at least 40% (wt/wt) of the polymerizable siloxane content is di-functional siloxanes having a molecular weight of at least 8,000 daltons, and wherein at least 25% (wt/wt) of the polymerizable siloxane content is mono-functional siloxanes having a molecular weight of less than 3000 daltons, and c. non-siloxane hydrophobic methacrylate monomers in an amount of at least 5% (wt/wt) based on the total weight of the formulation.

17. The hydrogel contact lens of claim 1, wherein the formulation further comprises:

a. N-methyl N-vinyl acetamide in an amount of from 30 to 50% (wt/wt) of the total formulation, b. di-functional, (meth)acrylate-containing siloxanes having a molecular weight of at least 8,000 daltons in an amount of from 20 to 40% (wt/wt) of the total formulation, c. mono-functional, (meth)acrylate-containing siloxanes having a molecular weight of less than 3000 Daltons in an amount of from 10 to 30 (wt/wt) of the total formulation, d. hydroxybutyl methacrylate, isobornyl methacrylate or a combination of hydroxybutyl methacrylate and isobornyl methacrylate in an amount of from 5 to 15% (wt/wt) of the total formulation.

18. The hydrogel contact lens of claim 16, wherein the di-functional siloxanes are a (meth)acrylate-containing siloxane monomer having a molecular weight of at least 8,000 daltons, represented by formula (III),

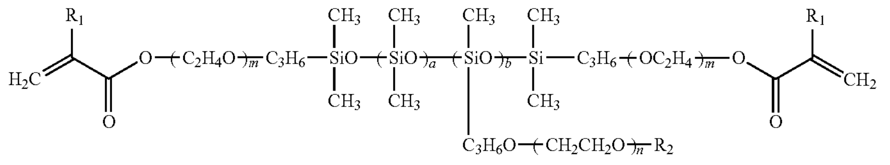

(III)

wherein $R_1$ is selected from either hydrogen or a methyl group; $R_2$ is selected from either hydrogen or a $C_{1-4}$ hydrocarbon group; m represents an integer of from 0 to 10; n represents an integer of from 4 up to about 15, 25, or 100; a and b represent integers of 1 or more; a+b is equal to 20-500; b/(a+b) is equal to 0.01-0.22; and a configuration of siloxane units includes a random configuration.

19. The hydrogel contact lens of claim 16, wherein the mono-functional siloxane monomer is a methacrylate-containing siloxane monomer represented by formula (II),

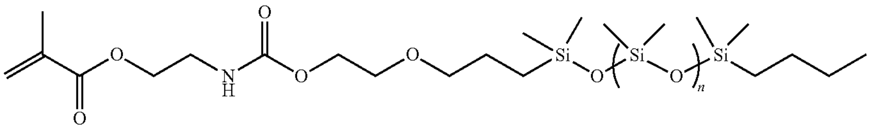

(II)

where n is an integer from about 10 to 15.

20. The hydrogel contact lens of claim 1, having the following light transmission characteristics:

| Blue light region | Transmission Characteristic | Ranges of Transmission Characteristics* Minimum value | Maximum value |
|---|---|---|---|
| Blue-violet cutoff | 1% T | 410 nm | 430 nm |
| | 10% T | 420 mm | 440 nm |
| Mid-blue transition region | 440 nm | 10% T | 75% T |
| | 450 nm | 28% T | 80% T |
| | 460 nm | 40% T | 85% T |
| High transmission blue light region | 470 nm | 55% T | 95% T |
| | 480 nm | 68% T | 95% T |
| | 490 nm | 80% T | 95% T |
| | 500 nm | 85% T | 95% T. |

*determined by UV-Visible measurements in air.

21. The hydrogel contact lens of claim 1, having a yellowness index as determined by the ASTM E313-05 method of less than 6.0.

22. The hydrogel contact lens of claim 1, having the following light transmission characteristics:

| Blue light region | Transmission Characteristic | Ranges of Transmission Characteristics* Minimum value | Maximum value |
|---|---|---|---|
| Blue-violet cutoff | 1% T | 410 nm | 430 nm |
| | 10% T | 420 nm | 440 nm |
| Mid-blue transition region | 440 nm | 10% T | 75% T |
| | 450 nm | 28% T | 80% T |
| | 460 nm | 40% T | 85% T |
| High transmission blue light region | 470 nm | 55% T | 95% T |
| | 480 nm | 68% T | 95% T |
| | 490 nm | 80% T | 95% T |
| | 500 nm | 85% T | 95% T |

*determined by UV-Visible measurements in air.

and having a yellowness index as determined by the ASTM E313-05 method of less than 6.0.

23. The hydrogel contact lens of claim 1, having a yellowness index as determined by the ASTM E313-05 method of less than 5.0.

24. The hydrogel contact lens of claim 1, wherein at least 40% of light is blocked in the 380 nm to 450 nm range.

25. The hydrogel contact lens of claim 1, wherein at least 50% of light is blocked in the 380 nm to 450 nm range.

26. A hydrogel contact lens obtained from polymerization of a formulation, the formulation comprising:

a high energy visible light (HEVL) absorber component consisting of a first high energy visible light (HEVL) absorber, and a second different high energy visible light (HEVL) absorber, wherein the first HEVL is 2-[2'-hydroxy-3'-tert-butyl-5'-(3"-methacryloyloxypropoxy)phenyl]-5-chloro-2H-benzotriazole (UV28), and the second different HEVL is 2-[2'-hydroxy-3'-tert-butyl-5'-(3"-methacryloyloxypropoxy)phenyl]-5-methoxy-2H-benzotriazole (UV13), the first HEVL absorber is present in an amount of from 0.5% to 0.7% (wt/wt) of the formulation and the second different HEVL absorber is present in an amount of from 0.7% to 1.6% (wt/wt) of the formulation, and a total amount of HEVL absorbers present in the formulation is from 1.2% to 2.0% (wt/wt).

27. A hydrogel contact lens obtained from polymerization of a formulation, the formulation comprising:

a high energy visible light (HEVL) absorber component consisting of a first high energy visible light (HEVL) absorber, and a second different high energy visible light (HEVL) absorber, wherein the first HEVL is 2-[2'-hydroxy-3'-tert-butyl-5'-(3"-methacryloyloxypropoxy)phenyl]-5-chloro-2H-benzotriazole (UV28), and the second different HEVL is 2-[2'-hydroxy-3'-tert-butyl-5'-(3"-methacryloyloxypropoxy)phenyl]-5-methoxy-2H-benzotriazole (UV13), the first HEVL absorber is present in an amount of from 0.4% to 0.7% (wt/wt) of the formulation and the second different HEVL absorber is present in an amount of from 0.7% to 1.6% (wt/wt) of the formulation, and a total amount of HEVL absorbers present in the formulation is from 1.1% to 2.0% (wt/wt), and at least 46% of light is blocked in the 380 nm to 450 nm range, and a yellowness index as determined by the ASTM E313-05 method is less than 6.0.

28. The hydrogel contact lens of claim 27, wherein at least 50% of light is blocked in the 380 nm to 450 nm range.

29. The hydrogel contact lens of claim 26, wherein the formulation further comprises a polymerizable UV absorbing agent comprising a benzophenone moiety in an amount not exceeding 1.5% (wt/wt).

* * * * *